US009659236B2

(12) United States Patent
Barker et al.

(10) Patent No.: US 9,659,236 B2
(45) Date of Patent: May 23, 2017

(54) SEMI-SUPERVISED METHOD FOR TRAINING MULTIPLE PATTERN RECOGNITION AND REGISTRATION TOOL MODELS

(71) Applicant: Cognex Corporation, Natick, MA (US)

(72) Inventors: Simon Barker, Sudbury, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/952,883

(22) Filed: Nov. 25, 2015

(65) Prior Publication Data

US 2016/0155022 A1    Jun. 2, 2016

Related U.S. Application Data

(62) Division of application No. 13/955,120, filed on Jul. 31, 2013.

(Continued)

(51) Int. Cl.
*G06K 9/62* (2006.01)

(52) U.S. Cl.
CPC ......... *G06K 9/6259* (2013.01); *G06K 9/6255* (2013.01); *G06K 9/6262* (2013.01); *G06K 9/6265* (2013.01)

(58) Field of Classification Search
CPC .. G06K 9/6255; G06K 9/6256; G06K 9/6262; G06T 2207/20081; G06T 7/0042; G06T 7/0046

See application file for complete search history.

(56) References Cited

U.S. PATENT DOCUMENTS 3,069,654 A   12/1962   Hough, Paul
3,560,930 A    2/1971   Howard
(Continued)

FOREIGN PATENT DOCUMENTS

DE   4406020   6/1995
EP   0265302   9/1987
(Continued)

OTHER PUBLICATIONS

Cognex Corporation, "Chapter 13 Golden Template Comparison," Cognex 3000/4000/5000 Vision Tools, pp. 521-626 (2000).

(Continued)

*Primary Examiner* — Li Liu
(74) *Attorney, Agent, or Firm* — Loginov IP

(57) ABSTRACT

A system and method for training multiple pattern recognition and registration models commences with a first pattern model. The model is trained from multiple images. Composite models can be used to improve robustness or model small differences in appearance of a target region. Composite models combine data from noisy training images showing instances of underlying patterns to build a single model. A pattern recognition and registration model is generated that spans the entire range of appearances of the target pattern in the set of training images. The set of pattern models can be implemented as either separate instances of pattern finding models or as a pattern multi-model. The underlying models can be standard pattern finding models or pattern finding composite models, or a combination of both.

12 Claims, 6 Drawing Sheets

Related U.S. Application Data

(60) Provisional application No. 61/841,142, filed on Jun. 28, 2013.

(56) References Cited

U.S. PATENT DOCUMENTS

| | | |
|---|---|---|
| 3,816,722 A | 6/1974 | Sakoe et al. |
| 3,898,617 A | 8/1975 | Kashioka et al. |
| 3,899,240 A | 8/1975 | Gabor |
| 3,899,771 A | 8/1975 | Saraga et al. |
| 3,936,800 A | 2/1976 | Ejiri et al. |
| 3,986,007 A | 10/1976 | Ruoff |
| 4,115,702 A | 9/1978 | Nopper |
| 4,115,762 A | 9/1978 | Akiyama et al. |
| 4,146,924 A | 3/1979 | Birk et al. |
| 4,183,013 A | 1/1980 | Agrawala et al. |
| 4,200,861 A | 4/1980 | Hubach et al. |
| 4,213,150 A | 7/1980 | Robinson et al. |
| 4,295,198 A | 10/1981 | Copeland et al. |
| 4,441,205 A | 4/1984 | Berkin et al. |
| 4,441,206 A | 4/1984 | Kuniyoshi et al. |
| 4,441,248 A | 4/1984 | Sherman et al. |
| 4,567,610 A | 1/1986 | McConnell |
| 4,570,180 A | 2/1986 | Baier et al. |
| 4,581,762 A | 4/1986 | Lapidus et al. |
| 4,618,989 A | 10/1986 | Tsukune et al. |
| 4,637,055 A | 1/1987 | Taylor |
| 4,651,341 A | 3/1987 | Nakashima et al. |
| 4,672,676 A | 6/1987 | Linger |
| 4,685,143 A | 8/1987 | Choate |
| 4,688,088 A | 8/1987 | Hamazaki et al. |
| 4,707,647 A | 11/1987 | Coldren et al. |
| 4,736,437 A | 4/1988 | Sacks et al. |
| 4,746,251 A | 5/1988 | Yoshikawa et al. |
| 4,763,280 A | 8/1988 | Robinson et al. |
| 4,783,826 A | 11/1988 | Koso |
| 4,783,828 A | 11/1988 | Sadjadi |
| 4,783,829 A | 11/1988 | Miyakawa et al. |
| 4,799,175 A | 1/1989 | Sano et al. |
| 4,809,348 A | 2/1989 | Meyer et al. |
| 4,823,394 A | 4/1989 | Berkin et al. |
| 4,843,631 A | 6/1989 | Steinpichler et al. |
| 4,845,765 A | 7/1989 | Juvin et al. |
| 4,849,914 A | 7/1989 | Medioni et al. |
| 4,860,374 A | 8/1989 | Murakami et al. |
| 4,860,375 A | 8/1989 | McCubbrey et al. |
| 4,876,457 A | 10/1989 | Bose |
| 4,876,728 A | 10/1989 | Roth |
| 4,881,249 A | 11/1989 | Chautemps et al. |
| 4,893,346 A | 1/1990 | Bishop |
| 4,903,313 A | 2/1990 | Tachikawa |
| 4,922,543 A | 5/1990 | Ahlbom et al. |
| 4,955,062 A | 9/1990 | Terui |
| 4,959,898 A | 10/1990 | Landman et al. |
| 4,962,541 A | 10/1990 | Doi et al. |
| 4,972,359 A | 11/1990 | Silver et al. |
| 4,979,223 A | 12/1990 | Manns et al. |
| 4,980,971 A | 1/1991 | Bartschat et al. |
| 4,982,438 A | 1/1991 | Usami et al. |
| 5,003,166 A | 3/1991 | Girod |
| 5,020,006 A | 5/1991 | Sporon-Fiedler |
| 5,027,417 A | 6/1991 | Kitakado et al. |
| 5,033,099 A | 7/1991 | Yamada et al. |
| 5,040,231 A | 8/1991 | Terzian |
| 5,046,109 A | 9/1991 | Fujimori et al. |
| 5,048,094 A | 9/1991 | Aoyama et al. |
| 5,060,276 A | 10/1991 | Morris et al. |
| 5,072,384 A | 12/1991 | Doi et al. |
| 5,086,478 A | 2/1992 | Kelly-Mahaffey et al. |
| 5,111,516 A | 5/1992 | Nakano et al. |
| 5,113,565 A | 5/1992 | Cipolla et al. |
| 5,161,201 A | 11/1992 | Kaga et al. |
| 5,168,530 A | 12/1992 | Peregrim et al. |
| 5,177,559 A | 1/1993 | Batchelder et al. |
| 5,206,917 A | 4/1993 | Ueno et al. |
| 5,245,674 A | 9/1993 | Cass et al. |
| 5,253,306 A | 10/1993 | Nishio |
| 5,253,308 A | 10/1993 | Johnson |
| 5,265,170 A | 11/1993 | Hine et al. |
| 5,268,999 A | 12/1993 | Yokoyama |
| 5,272,657 A | 12/1993 | Basehore |
| 5,280,351 A | 1/1994 | Wilkinson |
| 5,313,532 A | 5/1994 | Harvey et al. |
| 5,343,028 A | 8/1994 | Figarella et al. |
| 5,343,390 A | 8/1994 | Doi et al. |
| 5,347,595 A | 9/1994 | Bokser |
| 5,351,310 A | 9/1994 | Califano et al. |
| 5,371,690 A | 12/1994 | Engel et al. |
| 5,384,711 A | 1/1995 | Kanai et al. |
| 5,398,292 A | 3/1995 | Aoyama et al. |
| 5,406,642 A | 4/1995 | Maruya |
| 5,459,636 A | 10/1995 | Gee et al. |
| 5,471,403 A | 11/1995 | Fujimaga |
| 5,471,541 A | 11/1995 | Burtnyk et al. |
| 5,481,712 A | 1/1996 | Silver et al. |
| 5,487,117 A | 1/1996 | Burges et al. |
| 5,495,537 A | 2/1996 | Bedrosian et al. |
| 5,497,451 A | 3/1996 | Holmes |
| 5,500,906 A | 3/1996 | Picard et al. |
| 5,513,275 A | 4/1996 | Khalaj et al. |
| 5,515,453 A | 5/1996 | Hennessey et al. |
| 5,524,064 A | 6/1996 | Oddou et al. |
| 5,537,669 A | 7/1996 | Evans et al. |
| 5,539,841 A | 7/1996 | Huttenlocher et al. |
| 5,541,657 A | 7/1996 | Yamamoto et al. |
| 5,544,254 A | 8/1996 | Hartley et al. |
| 5,545,887 A | 8/1996 | Smith et al. |
| 5,548,326 A | 8/1996 | Michael |
| 5,550,763 A | 8/1996 | Michael |
| 5,550,937 A | 8/1996 | Bell et al. |
| 5,555,317 A | 9/1996 | Anderson |
| 5,555,320 A | 9/1996 | Irie et al. |
| 5,557,684 A | 9/1996 | Wang et al. |
| 5,559,901 A | 9/1996 | Lobregt |
| 5,568,563 A | 10/1996 | Tanaka et al. |
| 5,570,430 A | 10/1996 | Sheehan et al. |
| 5,586,058 A | 12/1996 | Aloni et al. |
| 5,602,937 A | 2/1997 | Bedrosian et al. |
| 5,602,938 A | 2/1997 | Akiyama et al. |
| 5,613,013 A | 3/1997 | Schuette |
| 5,621,807 A | 4/1997 | Eibert et al. |
| 5,623,560 A | 4/1997 | Nakajima et al. |
| 5,625,707 A | 4/1997 | Diep et al. |
| 5,625,715 A | 4/1997 | Trew et al. |
| 5,627,912 A | 5/1997 | Matsumoto |
| 5,627,915 A | 5/1997 | Rosser |
| 5,631,975 A | 5/1997 | Riglet et al. |
| 5,633,951 A | 5/1997 | Moshfeghi |
| 5,638,116 A | 6/1997 | Shimoura et al. |
| 5,638,489 A | 6/1997 | Tsuboka |
| 5,640,200 A | 6/1997 | Michael |
| 5,650,828 A | 7/1997 | Lee |
| 5,657,403 A | 8/1997 | Wolff et al. |
| 5,663,809 A | 9/1997 | Miyaza et al. |
| 5,673,334 A | 9/1997 | Nichani et al. |
| 5,676,302 A | 10/1997 | Petry |
| 5,686,973 A | 11/1997 | Lee |
| 5,694,482 A | 12/1997 | Maali et al. |
| 5,694,487 A | 12/1997 | Lee |
| 5,703,960 A | 12/1997 | Soest |
| 5,703,964 A | 12/1997 | Menon et al. |
| 5,708,731 A | 1/1998 | Shimotori et al. |
| 5,717,785 A | 2/1998 | Silver |
| 5,751,853 A | 5/1998 | Michael |
| 5,754,226 A | 5/1998 | Yamada et al. |
| 5,757,956 A | 5/1998 | Koljonen et al. |
| 5,761,326 A | 6/1998 | Brady et al. |
| 5,768,421 A | 6/1998 | Gaffin et al. |
| 5,793,901 A | 8/1998 | Matsutake et al. |
| 5,796,868 A | 8/1998 | Dutta-Choudhury et al. |
| 5,815,198 A | 9/1998 | Vachtsevanos et al. |
| 5,822,742 A | 10/1998 | Alkon et al. |
| 5,825,483 A | 10/1998 | Michael et al. |
| 5,825,913 A | 10/1998 | Rostami et al. |
| 5,825,922 A | 10/1998 | Pearson et al. |

(56) References Cited

U.S. PATENT DOCUMENTS

| | | |
|---|---|---|
| 5,828,769 A | 10/1998 | Burns |
| 5,828,770 A | 10/1998 | Leis et al. |
| 5,835,622 A | 11/1998 | Koljonen et al. |
| 5,845,007 A | 12/1998 | Ohashi et al. |
| 5,845,288 A | 12/1998 | Syeda-Mahmood |
| 5,848,184 A | 12/1998 | Taylor et al. |
| 5,848,189 A | 12/1998 | Pearson et al. |
| 5,850,466 A | 12/1998 | Schott et al. |
| 5,850,469 A | 12/1998 | Martin et al. |
| 5,859,923 A | 1/1999 | Petry et al. |
| 5,861,910 A | 1/1999 | McGarry et al. |
| 5,862,245 A | 1/1999 | Renouard et al. |
| 5,864,779 A | 1/1999 | Fujimoto |
| 5,871,018 A | 2/1999 | Delp et al. |
| 5,875,040 A | 2/1999 | Matraszek et al. |
| 5,881,170 A | 3/1999 | Araki et al. |
| 5,890,808 A | 4/1999 | Neff et al. |
| 5,912,984 A | 6/1999 | Michael et al. |
| 5,912,985 A | 6/1999 | Morimoto et al. |
| 5,917,733 A | 6/1999 | Bangham |
| 5,926,568 A | 7/1999 | Chaney et al. |
| 5,930,391 A | 7/1999 | Kinjo |
| 5,933,516 A | 8/1999 | Tu et al. |
| 5,933,523 A | 8/1999 | Drisko et al. |
| 5,937,084 A | 8/1999 | Crabtree et al. |
| 5,940,535 A | 8/1999 | Huang |
| 5,943,441 A | 8/1999 | Michael |
| 5,943,442 A | 8/1999 | Tanaka |
| 5,950,158 A | 9/1999 | Wang |
| 5,953,130 A | 9/1999 | Benedict et al. |
| 5,974,169 A | 10/1999 | Bachelder |
| 5,974,365 A | 10/1999 | Mitchell |
| 5,978,080 A | 11/1999 | Michael et al. |
| 5,982,475 A | 11/1999 | Bruning et al. |
| 5,987,172 A | 11/1999 | Michael |
| 5,995,648 A | 11/1999 | Drisko et al. |
| 5,995,953 A | 11/1999 | Rindtorff et al. |
| 6,002,793 A | 12/1999 | Silver et al. |
| 6,005,978 A | 12/1999 | Garakani |
| 6,021,220 A | 2/2000 | Anderholm |
| 6,023,530 A | 2/2000 | Wilson |
| 6,026,186 A | 2/2000 | Fan |
| 6,026,359 A | 2/2000 | Yamaguchi et al. |
| 6,035,006 A | 3/2000 | Matui |
| 6,035,066 A | 3/2000 | Michael |
| 6,052,489 A | 4/2000 | Sakaue |
| 6,061,086 A | 5/2000 | Reimer et al. |
| 6,064,338 A | 5/2000 | Kobayakawa et al. |
| 6,064,388 A | 5/2000 | Reyzin |
| 6,064,958 A | 5/2000 | Takahashi et al. |
| 6,067,379 A | 5/2000 | Silver |
| 6,070,160 A | 5/2000 | Geary et al. |
| 6,078,700 A | 6/2000 | Sarachik |
| 6,081,620 A | 6/2000 | Anderholm |
| 6,111,984 A | 8/2000 | Fukasawa |
| 6,115,052 A | 9/2000 | Freeman et al. |
| 6,118,893 A | 9/2000 | Li |
| 6,122,399 A | 9/2000 | Moed |
| 6,128,405 A | 10/2000 | Fujii |
| 6,137,893 A | 10/2000 | Michael et al. |
| 6,141,033 A | 10/2000 | Michael et al. |
| 6,151,406 A | 11/2000 | Chang et al. |
| 6,154,566 A | 11/2000 | Mine et al. |
| 6,154,567 A | 11/2000 | McGarry |
| 6,173,066 B1 | 1/2001 | Peurach et al. |
| 6,173,070 B1 | 1/2001 | Michael et al. |
| 6,178,261 B1 | 1/2001 | Williams et al. |
| 6,178,262 B1 | 1/2001 | Picard et al. |
| 6,188,784 B1 | 2/2001 | Linker et al. |
| 6,215,915 B1 | 4/2001 | Reyzin |
| 6,226,418 B1 | 5/2001 | Miller et al. |
| 6,226,783 B1 | 5/2001 | Limondin et al. |
| 6,246,478 B1 | 6/2001 | Chapman et al. |
| 6,272,244 B1 | 8/2001 | Takahashi et al. |
| 6,272,245 B1 | 8/2001 | Lin |
| 6,311,173 B1 | 10/2001 | Levin |
| 6,324,298 B1 | 11/2001 | O'Dell et al. |
| 6,324,299 B1 | 11/2001 | Sarachik et al. |
| 6,345,106 B1 | 2/2002 | Borer |
| 6,363,173 B1 | 3/2002 | Stentz et al. |
| 6,381,366 B1 | 4/2002 | Taycher et al. |
| 6,381,375 B1 | 4/2002 | Reyzin |
| 6,385,340 B1 | 5/2002 | Wilson |
| 6,396,949 B1 | 5/2002 | Nichani |
| 6,408,109 B1 | 6/2002 | Silver et al. |
| 6,421,458 B2 | 7/2002 | Michael et al. |
| 6,424,734 B1 | 7/2002 | Roberts et al. |
| 6,453,069 B1 | 9/2002 | Matsugu et al. |
| 6,457,032 B1 | 9/2002 | Silver |
| 6,462,751 B1 | 10/2002 | Felser et al. |
| 6,466,923 B1 | 10/2002 | Young et al. |
| 6,516,092 B1 | 2/2003 | Bachelder et al. |
| 6,529,852 B2 | 3/2003 | Knoll et al. |
| 6,532,301 B1 | 3/2003 | Krumm et al. |
| 6,594,623 B1 | 7/2003 | Wang et al. |
| 6,608,647 B1 | 8/2003 | King |
| 6,625,303 B1 | 9/2003 | Young et al. |
| 6,636,634 B2 | 10/2003 | Melikian et al. |
| 6,639,624 B1 | 10/2003 | Bachelder et al. |
| 6,658,145 B1 | 12/2003 | Silver et al. |
| 6,681,151 B1 | 1/2004 | Weinzimmer et al. |
| 6,687,402 B1 | 2/2004 | Taycher et al. |
| 6,690,842 B1 | 2/2004 | Silver et al. |
| 6,691,126 B1 | 2/2004 | Syeda-Mahmood |
| 6,691,145 B1 | 2/2004 | Shibata et al. |
| 6,714,679 B1 | 3/2004 | Scola et al. |
| 6,728,582 B1 | 4/2004 | Wallack |
| 6,748,104 B1 | 6/2004 | Bachelder et al. |
| 6,751,338 B1 | 6/2004 | Wallack |
| 6,751,361 B1 | 6/2004 | Wagman |
| 6,760,483 B1 | 7/2004 | Elichai et al. |
| 6,771,808 B1 | 8/2004 | Wallack |
| 6,785,419 B1 | 8/2004 | Jojic et al. |
| 6,836,567 B1 | 12/2004 | Silver et al. |
| 6,850,646 B1 | 2/2005 | Silver |
| 6,856,698 B1 | 2/2005 | Silver et al. |
| 6,859,548 B2 | 2/2005 | Yoshioka et al. |
| 6,870,566 B1 | 3/2005 | Koide et al. |
| 6,901,236 B2 | 5/2005 | Saitoh et al. |
| 6,903,177 B2 | 6/2005 | Seo et al. |
| 6,909,798 B1 | 6/2005 | Yukawa et al. |
| 6,950,548 B1 | 9/2005 | Bachelder et al. |
| 6,959,112 B1 | 10/2005 | Wagman |
| 6,963,338 B1 | 11/2005 | Bachelder et al. |
| 6,973,207 B1 | 12/2005 | Akopyan et al. |
| 6,975,764 B1 | 12/2005 | Silver et al. |
| 6,985,625 B1 | 1/2006 | Silver et al. |
| 6,993,192 B1 | 1/2006 | Silver et al. |
| 7,006,669 B1 | 2/2006 | Lavagnino et al. |
| 7,006,712 B1 | 2/2006 | Silver et al. |
| 7,016,539 B1 | 3/2006 | Silver et al. |
| 7,043,055 B1 | 5/2006 | Silver |
| 7,043,081 B1 | 5/2006 | Silver et al. |
| 7,058,225 B1 | 6/2006 | Silver et al. |
| 7,065,262 B1 | 6/2006 | Silver et al. |
| 7,068,817 B2 | 6/2006 | Bourg et al. |
| 7,088,862 B1 | 8/2006 | Silver et al. |
| 7,119,351 B2 | 10/2006 | Woelki |
| 7,139,421 B1 | 11/2006 | Fix et al. |
| 7,164,796 B1 | 1/2007 | Silver et al. |
| 7,190,834 B2 | 3/2007 | Davis |
| 7,239,929 B2 | 7/2007 | Ulrich et al. |
| 7,251,366 B1 | 7/2007 | Silver et al. |
| 7,260,813 B2 | 8/2007 | Du et al. |
| 7,853,919 B2 | 12/2010 | Huang et al. |
| 7,945,234 B2 | 5/2011 | Lee et al. |
| 8,081,820 B2 | 12/2011 | Davis et al. |
| 8,131,063 B2 | 3/2012 | Xiao et al. |
| 8,144,976 B1 | 3/2012 | Shiell et al. |
| 8,229,222 B1 | 7/2012 | Silver et al. |
| 8,244,041 B1 | 8/2012 | Silver et al. |
| 8,249,362 B1 | 8/2012 | Silver et al. |
| 8,254,695 B1 | 8/2012 | Silver et al. |
| 8,265,395 B1 | 9/2012 | Silver et al. |

(56) References Cited

U.S. PATENT DOCUMENTS

| | | | |
|---|---|---|---|
| 8,270,748 | B1 | 9/2012 | Silver et al. |
| 8,295,613 | B1 | 10/2012 | Silver et al. |
| 8,315,457 | B2 | 11/2012 | Bogan et al. |
| 8,320,675 | B1 | 11/2012 | Silver et al. |
| 8,331,673 | B1 | 12/2012 | Silver et al. |
| 8,335,380 | B1 | 12/2012 | Silver et al. |
| 8,363,942 | B1 | 1/2013 | Silver et al. |
| 8,363,956 | B1 | 1/2013 | Silver et al. |
| 8,363,972 | B1 | 1/2013 | Silver et al. |
| 8,457,390 | B1 | 6/2013 | Barker et al. |
| 8,891,858 | B1 | 11/2014 | Preetham et al. |
| 2002/0054699 | A1 | 5/2002 | Roesch et al. |
| 2004/0081346 | A1 | 4/2004 | Louden et al. |
| 2005/0117801 | A1 | 6/2005 | Davis et al. |
| 2006/0110063 | A1 | 5/2006 | Weiss |
| 2009/0089736 | A1 | 4/2009 | Huang et al. |
| 2009/0096790 | A1 | 4/2009 | Wiedemann et al. |
| 2009/0185715 | A1 | 7/2009 | Hofhauser et al. |
| 2009/0290788 | A1 | 11/2009 | Bogan et al. |
| 2010/0146476 | A1 | 6/2010 | Huang et al. |
| 2011/0150324 | A1* | 6/2011 | Ngan .......... G06K 9/00704 382/159 |
| 2011/0202487 | A1 | 8/2011 | Koshinaka |
| 2012/0029289 | A1 | 2/2012 | Kucklick |
| 2012/0054658 | A1* | 3/2012 | Chuat .......... G06F 17/30247 715/771 |
| 2013/0018825 | A1* | 1/2013 | Ghani .......... G06N 99/005 706/12 |
| 2013/0214280 | A1 | 8/2013 | Sato |
| 2013/0279800 | A1* | 10/2013 | Ranganathan ..... G06K 9/469 382/159 |
| 2014/0198980 | A1 | 7/2014 | Fukui et al. |

FOREIGN PATENT DOCUMENTS

| | | |
|---|---|---|
| JP | 63078009 | 4/1988 |
| JP | 6-95685 | 4/1994 |
| JP | 06160047 | 6/1994 |
| JP | 3598651 | 12/2004 |
| WO | 9511491 | 4/1995 |
| WO | 9521376 | 8/1995 |
| WO | 9522137 | 8/1995 |
| WO | 9927456 | 6/1999 |

OTHER PUBLICATIONS

Cognex Corporation, Chapter 7 CONLPAS, Cognex 3000/4000/5000 Programmable Vision Engines, Vision Tools, Revision 7.4, P/N 590-0136, pp. 307-340 (1996).
Cognex Corporation, Cognex 3000/4000/5000 Vision Tool, Revision 7.6, Chapter 4, Caliper Tool, 1996.
Cognex Corporation, Cognex 3000/4000/5000 Vision Tool, Revision 7.6, Chapter 5, Inspection, 1996.
Cognex Corporation, Cognex 3000/4400 SMD Tools Release 5.2, SMD 2, 1994.
Cognex Corporation, Cognex 4000/5000 SMD Placement Guidance Package, User's Manual Release 3.8.00, 1998.
Cognex Corporation, Cognex MVS-8000 Series, CVL Vision Tools Guide, pp. 25-136 Release 5.4 590-6271 (2000).
Cognex Corporation, Cognex MVS-80000 Series, GDE User's Guide, Revision 1.1, Apr. 7, 2000.
"Apex Model Object", Cognex Corporation, acuWin version 1.5, 1997, pp. 1-17.
"Apex Search Object", acuWin version 1.5, 1997, pp. 1-35.
"Apex Search Object Library Functions", Cognex Corporation, 1998.
"Cognex 2000/3000/4000 Vision Tools", Cognex Corporation, Chapter 2 Searching Revision 5.2 P/N 590-0103, 1992, pp. 1-68.
"Cognex 3000/4000/5000 Programmable Vision Engines, Vision Tools", Chapter 1 Searching, Revision 7.4 590-1036, 1996, pp. 1-68.
"Cognex 3000/4000/5000 Programmable Vision Engines, Vision Tools", Chapter 14 Golden Template Comparison, 1996, pp. 569-595.
"Description of Sobal Search", Cognex Corporation, 1998.
Alexander et al., "The Registration of MR Images Using Multiscale Robust Methods", Magnetic Resonance Imaging, 1996, pp. 453-468, vol. 5.
Anisimov et al., "Fast Hierarchical matching of an arbitrarily oriented template", Pattern Recognition Letters, vol. 14, No. 2, pp. 95-101 (1993).
Anuta, Paul E., "Spatial Registration of Multispectral and Multitemporal Digital Imagery Using Fast Fourier Transform Techniques", IEEE Transactions on Geoscience Electronics, Oct. 1970, pp. 353-368, vol. GE-8, No. 4.
Araujo et al., "A Fully Projective Formulation for Lowe's Tracking Algorithm", The University of Rochester Computer Science Department, pp. 1-41, Nov. 1996.
Ashburner et al., "Incorporating Prio Knowledge into Image Registration," Neuroimage, vol. 6, No. 4, pp. 344-352 (1997).
Ashburner et al., "Nonlinear Spatial Normalization using Basis Functions,: The Welcome Depart. Of Cognitice Neurology", Institute of Neurology, Queen Square, London, UK, pp. 1-34 (1999).
Ashburner et al., "Nonlinear Spatial Normalization using Basis Functions,", Human Brain Mapping, vol. 7, No. 4, pp. 254-266 (1999).
Bachelder et al., "Contour Matching Using Local Affine Transformations", Massachusetts Institute of Technology Artificial Intelligence Laboratory, A.I. Memo No. 1326 (Apr. 1992).
Baker, J, "Multiresolution Statistical Object Recognition", Artificial Intelligence Laboratory, Massachusetts Institute of Technology, pp. 1-6, (1994). 205.
Baker, J., "Multiresolution Statistical Object Recognition", master's thesis, Massachusetts Institute of Technology (1994).
Balkenius et al., "Elastic Template Matching as a Basis for Visual Landmark Recognition and Spatial Navigation", AISB workshop on Spatial Reasoning in Mobile Robots and Animals, Jul. 1997, 1-10.
Balkenius et al., "The XT-1 Vision Architecture", Symposium on Image Analysis, Lund University Cognitive Science, 1996, pp. 1-5.
Ballard et al., "Searching Near and Approximate Location", Section 4.2, Computer Vision, 1982, pp. 121-131.
Ballard et al., "The Hough Method for Curve Detection", Section 4.3, Computer Vision, 1982, pp. 121-131.
Ballard et al., "Generalizing the Hough Transform to Detect Arbitrary Shapes", Pattern Recognition, vol., 13, No. 2 Pergamon Press Ltd. UK, 1981, pp. 111-122.
Belongie et al., "Shape Matching and Object Recognition Using Shape Contexts", IEEE Transactions on Pattern Analysis and Machine Intelligence, 24(24):509-522 (Apr. 2002).
Besl et al., "A Method for Registration of 3D Shapes", IEEE Transactions on Pattern Analysis and Machine Intelligence, Feb. 1992, pp. 239-256, vol. 14, No. 2.
Bichsel, et al., "Strategies of Robust Object Recognition fo rthe Automatic Identification of Human Faces", 1991, 1-157.
Bileschi et al., "Advances in Component-based Face Detection", Lecture notes in Computer Science, Springer Verlag, New York, NY, vol. 2388, 2002, 135-143.
Blais et al., "Advances in Component-based Face Detection", Lecture notes in Computer Science, Springer Verlag, New York, NY, vol. 2388, (2002), 135-143.
Bookstein, F L., "Principal Warps: Thin-Plate Splines and the Decomposition of Deformations", IEEE Transactions on pattern Analysis and Machine Intelligence, IEEE Inc., New York, vol. 11, No. 6, Jun. 1, 1989.
Borgefors, Gunilla, "Hierarchical Chamfer Matching: A Parametric Edge Matching Algorithm", IEEE Transaction on Pattern Analysis and Machine Intelligence, vol. 10, No. 6, Nov. 1988.
Breuel, T, "Geometric Aspects of Visual Object Recognition", Technical Report 1374, MIT Artificial Intelligence Laboratory, May 1992, pp. 1-173.
Brown, Lisa G., "A Survey of Image Registration Techniques", ACM Computing Surveys, vol. 24, No. 4 Association for Computing Machinery, 1992, pp. 325-376.

(56) References Cited

OTHER PUBLICATIONS

Bruckstein et al., "Design of Shapes for Precise Image Registration", IEEE Transaction on Information Theory, vol., 44, No. 7, Nov. 1998.
Bruzug et al., "Using an Entropy Similarity Measure to Enhance the Quality of DSA Images with an Algorithm Based on Template Matching", Visualization in Biomedical Computer, pp. 235-240 (1996).
Caelli et al., "Fast Edge-Only Matching Techniques for Robot Pattern Recognition", Computer Vision, Graphics and Image Processing 39, Academic Press, Inc., 1987, pp. 131-143.
Caelli et al., "On the Minimum Number of Templates Required for Shift, Rotation and Size Invariant Pattern Recognition", Pattern Recognition, vol. 21, No. 3, Pergamon Press plc, 1988, pp. 205-216.
Chen et al., "Object Modeling by Registration of Multiple Range Images", Image and Vision Computing, vol. 10, No. 3, pp. 145-155 (1992).
Chen et al., "Object Modeling by Registration of Multiple Range Images", in IEEE ICRA, pp. 2724-2729 (1991).
Chew et al., "Geometric Pattern Matching under Euclidean Motion", Computational Geometry, vol. 7, Issues 1-2, Jan. 1997, pp. 113-124, 1997 Published by Elsevier Science B.V.
Cognex Corporation, "Cognex Products on Sale as of one year before filing for U.S. Pat. No. 7,016,539, Jul. 12, 1997".
Cognex Corporation, "description of Overlap in Cognex search tool and description of Overlap in Cnlpas Tool as of Jul. 12, 1997".
Cognex Corporation, "Excerpted description of AcuFinder product of Mar. 1997 as written Mar. 1, 2012", Mar. 1997.
Cootes et al., "Active Shape Models—Their Training and Application", Computer Vision and Image Understanding, vol. 61, No. 1, Jan. 1995, 38-59.
Cox et al., "Predicting and Estimating the Accuracy of a Subpixel Registration Algorithm, IEEE Transactions on Pattern Analysis and Machine Intelligence", vol., 12, No. 8, Aug. 1990, 721-734.
Cox et al., "On the Congruence of Noisy Images to Line Segment Models", International Conference on Computer Vision, pp. 252-258 (1988).
Crouzil et al., "A New Correlation Criterion Based on Gradient Fields Similarity", Proceedings of the 13th International Conference on Pattern Recognition vol. I Track A, Computer Vision, 1996, pp. 632-636.
Dana et al., "Registration of Visible and Infrared Images", pp. 1-12, vol. 1957.
Declerck et al., "Automatic Registration and Alignment on a Template of Cardiac Stress & Rest SPECT Images", IEEE Proc of MMBIA 1996, pp. 212-221.
Defigueiredo et al., "Model Based Orientation Independent 3-D machine Vision Techniques,", IEEE Transactions on Aerospace and Electronic Systems, vol. 24, No. 5 Sep. 1988, pp. 597-607.
Dementhon et al., "Model-Based Object Pose in 25 Lines of Code", International Journal of Computer Vision, 1995, pp. 123-141, Kluwer Academic Publishers, Boston, MA.
Dementhon et al., "Model-Based Object Pose in 25 Lines of Code", Proceedings of the Second European Conference on Computer Vision, pp. 335-343 (1992).
Devernay, F., "A Non-Maxima Suppression Method for Edge Detection with Sub-Pixel Accuracy", Institut National de Recherche en Informatique et en Automatique, No. 2724, Nov. 1995, 24 pages.
Dorai et al., "Optimal Registration of Multiple Range Views", IEEE 1994, pp. 569-571.
Drewniok et al., "High-Precision Localization of Circular Landmarks in Aerial Images", Proc. 17, DAGM-Symposium, Mustererkennung 1995, Bielfield, Germany, Sept 13-15, 1995, pp. 594-601.
Duta et al., "Automatic construction of 2D shape models", IEEE Transaction on Pattern Analysis and Machine Intelligence, IEEE Service Center, Los Alamitos, CA, May 1, 2001.
Eric et al., "On the Recognition of Parameterized 2D Objects, International Journal of Computer Vision", (1988), 353-372.

Feddema et al., "Weighted Selection of Image Features for Resolved Rate Visual Feedback Control", IEEE Transactions on Robitics and Automation, vol. 7 No. 1, Feb. 1991, pp. 31-47.
Feldmar et al., "3D-2D Projective Registration of Free-Form Curves and Surfaces", Computer Vision and Image Understanding, vol. 65, No. 3, (Mar. 1997), 403-424.
Fischer et al., "On the Use of Geometric and Semantic Models for Component-Based Building Reconstruction", Institute for Photography, University of Bonn, pp. 101-119, 1999.
Fitzpatrick et al., "Handbook of Medical Imaging", vol. 2: Medical image Processing and Analysis, SPIE Press, Bellingham, WA, 2000, 447-513.
Foley et al., "Introduction to Computer Graphics", pp. 36-49 (1994).
Forsyth et al., "Invariant Descriptors for 3-D Object Recognition and Pose", IEEE Transactions on Pattern Analysis and Machines Intelligence, vol. 13, No. 10, Oct. 1991, pp. 971-991.
Foster et al., "Attributed Image Matching Using a Minimum Representation Size criterion", PhD. Thesis, Carnegie mellon University, 1987, pp. 1-142.
Foster et al., "Determining objection orientation from a single image using multiple information sources", CMU-RI-TR-84-15, Jun. 1984, pp. 1-96.
Foster, Nigel, "Determining objection orientation using ellipse fitting", SPIE vol. 521-Intelligent Robots and Computer Vision, 1985 pp. 34-43.
Gavrila et al., 3-D Model-Based Tracking of Human Upper Body Movement, A Multi-View Approach, Computer Vision Laboratory, 1995, 253-258.
Gavrila et al., "3-D Model-Based Tracking of Humans in Action", A Multi-View Approach, Computer Vision Laboratory, 1997, 73-80.
Gavrila et al., "Multi-Feature Hierarchical Template Matching using Distance Transforms", Daimler-Benz AG, Research and Technology, 6 pages, 1996.
Gdalyahu et al., "Self-Organization in Vision: Stochastic Clustering for Image Segmentation, Perceptual Grouping, and Image Database Organization", IEEE Transactions on Pattern Analysis and Machine Intelligence, IEEE Inc., New York, US, vol. 23, No. 10, Oct. 2001, 1053-1074.
Ge et al., "Surface-based 3-D image registration using the Iterative Closest Point Algorithm with a closest point transform", Medical Imaging 1996: Image Processing, M. Loew, K. Hanson, Editors, Proc. SPIE 2710, pp. 358-367 (1996).
Geiger et al., "Dynamic Programming for Detecting, Tracking, an Matching Deformable contours", IEEE, 1995, pp. 294-302.
Gennery, Donald B., "Visual Tracking of Known Three-Dimensional Objects", International Journal of Computer Vision, 1992, 243-270.
Gorman et al., "Recognition of incomplete polygonal objections", IEEE, pp. 518-522 1989.
Gottesfeld et al., "A Survey of Image Registration Techniques", Department of Computer Science, Columbia University, New York, NY 10027, ACM Computing Surveys, vol. 24, No. 4, Dec. 1992.
Gottesfeld et al., "Registration of Planar Film Radiographs with Computed Tomography", 1996 Workshop on mathematical Methods in Biomedical Image Analysis (MMBIA '96), pp. 42-51 (1996).
Grimson et al., "On the Sensitivity of the Hough Transform for Object Recognition", IEEE Transactions on Pattern Analysis and Machine Intelligence, vol. 12. No. 3, 1990, pp. 255-274.
Haag et al., "Combination of Edge Element and Optical Flow Estimates for 3D Model Based Vehicle Tracking in Traffic Images Sequences", International Journal of Computer Vision, 1999, pp. 295-319.
Han et al., "An Edge-Based Block Matching Technique for Video Motion", Image Processing Algorithms and Techniques II, 1991, pp. 395-408, vol. 1452.
Haralick et al., "Pose Estimation from Corresponding Point Data", IEEE Trans. On Systems, Man and Cybernetics, vol. 19, No. 6, pp. 1426-1445, 1989.
Hashimoto et al., "An Edge Point template Matching Method for High Speed Difference Detection between Similar Images", Industrial Electronics and systems Development Laboratory Mitsubishi Electric Corp., PRU, vol. 90, No. 3, (1990), 8 pages.

(56) References Cited

OTHER PUBLICATIONS

Hashimoto et al., "High Speed Template Matching Algorithm Using Information of Edge Points", Trans IEICE Technical Report D-II, vol. J74-D-II, No. 10, pp. 1419-1427 (Oct. 1991).
Hashimoto et al., "High-Speed Template Matching Algorithm Using Contour Information", Proc. SPIE, vol. 1657, pp. 374-385 (1992).
Hashimoto et al., "High-Speed Template Matching Algorithm Using Information of Contour Points", Systems and Computers in Japan, 1992, pp. 78-87, vol. 23, No. 9.
Hauck et al., "Hierarchical Recognition of Articulated Objects from Single Perspective Views", IEEE Computer Society Conference on Computer Vision and Pattern Recognition, 1997. Proceedings., 1997, 1-7.
Hauck et al., "A Hierarchical World Model with Sensor—and Trask-Specific Features", 8 pages 1996.
Havelock, David, "Geometric Precision in Noise-Fee Digital Images", IEEE Transactions on Pattern Analysisi and Machine Intelligence, vol. II, No. 10, Oct. 1989.
Hicks et al., "Automatic landmarking for building biological shape models", IEEE ICIP 2002, vol. 2, pp. 801-804, Sep. 22, 2002.
Hill et al., "Automatic landmark gerneration for point distribution models", Proc. British Machine Vision Conference, vol. 2, pp. 429-438, 1994.
Hill et al., "Medical Image Registration", Institute of Physics Publishing; Phys. Med. Biol. 46 (2001), pp. R1-R45.
Hill et al., "Voxel Similarity Measures for Automated Image Registration", Prov. SPIE, vol. 2359, pp. 205-216 (1994).
Hill, John W., "Machines Intelligence Research Applied to Industrial Automation", U.S. Department of Commerce, National Technical Information Service, SRI International Tenth Report, Nov. 1980.
Hirako, K, "Development of an automatic detection system for microcalcifications lesion in mammography", Trans. IEICE Japan D-II, vol. J78-D-II, No. 9, pp. 1334-1343 (Sep. 1995).
Hirooka et al., "Hierarchical distributed template matching", Proc. SPIE vol. 3029, p. 176-183 (1997).
Hoff et al., "Pose Estimation of Artificial Knee Implants in Fluoroscopy Images Using a Template Matching Technique", Proc. Of 3rd IEEE Workshop on Applications of Computer Vision, Dec. 2-4, 1996, 7 pages.
Holden et al., "Voxel Similarity Measures for 3D Serial Mr Brain image Registration", IEEE Transactions on Medical Imaging, vol., 19, No. 2 pp. 94-102 (2000).
Hoogs et al., "Model Based Learning of Segmentations", pp. 494-499, IEEE, 1996.
Hsieh et al., "Image Registration Using a New Edge-Based Approach", Computer Vision and Image Understanding, vol. 67, No. 2, 1997, pp. 112-130.
Hu et al., "Expanding the Range of Convergence of the CORDIC Algorithm", IEEE Transactions on Computers vol. 40, No. 1, pp. 13-21 (Jan. 1991).
Hu, Y, "CORDIC-Based VLSI Architectures for Digital Signal Processing", IEEE Signal Processing Magazine, pp. 16-35, 1053-5888/92 (Jul. 1992).
Hugli et al., "Geometric matching of 3D objects assessing the range of successful initial configurations", IEEE pp. 101-106, 1997.
Hung et al., "Subpixel Edge Estimation Using Geometrical Edge Models with Noise Miniatruization", 1994, pp. 112-117.
Hutchinson et al., "A Tutorial on Visual Servo Control", IEEE Transactions on Robotics and Automation, vol. 12, No. 5, Oct. 1996, 20 pages.
Huttenlocher et al., "A Multi-Resolution Technique for Comparing Images Using the Hausdorff Distance", 1993 IEEE, pp. 705-706.
Huttenlocher, Daniel P., "Comparing Images using the Hausdorff Distance", IEEE Transactions on Pattern Analysis and Machine Intelligence, vol. 15, No. 9, Sep. 1993.
Jacobs, D.W., "The Use of Grouping in Visual Object Recognition", MIT Artificial Intelligence Laboratory, Office of Naval Research, pp. 1-162, Oct. 1988.
Jahne et al., "Geissler, Handbook of Computer Vision and Applications", vol. 2, Academic Press, (1990), Chapter 5, 43 pages.
Jain et al., "Object Matching Using Deformable Templates", IEEE Transactions on Pattern Analysis and Machine Intelligence, vol. 18, No. 3, Mar. 1996, 267-278.
Jain et al., "Machine Vision", McGraw-Hill, 1995, 207 pages.
Jebara, T.S., "3D Pose Estimation and Normalization for Face Recognition", Undergraduate Thesis, Department of Electrical Engineering, McGill University, May 1996, 138 pages.
Jiang et al., "A New Approach to 3-D Registration of Multimodality Medical Images by Surface Matching", SPIE vol. 1808, pp. 196-213 (1992).
Jiang et al., "Image Registration of Multimodality 3-D Medical Images by Chamfer Matching", Biomedical Image Processing and Three Dimensional Microscopy, SPIE vol. 1660, pp. 356-366 (1992).
Jokinen, 0, "Area-Based Matching for Simultaneous Registration of Multiple 3-D Profile Maps", CVIU, vol. 71, No. 3, pp. 431-447 (Sep. 1998).
Jokinen, O, "Building 3-D City Models from Multiple Unregistered Profile Maps", First International Conference on Recent Advances in 3-D Digital Imaging and Modeling, pp. 242-249 (1997).
Jokinen, O., "Matching and modeling of multiple 3-D disparity and profile maps", Ph.D Thesis Helsinki Univ. Of Technology, Helsinki, Finland (2000).
Jokinen et al., "Relative orientation of two disparity maps in stereo vision", 6 pages 1995.
Jordan, J, "Alignment mark detection using signed-contrast gradient edge maps", Proc. SPIE vol. 1661, pp. 396-407 (1992).
Joseph, S. H., "Fast Optimal Pose Estimation for Matching in Two Dimensions", Image Processing and its Applications, Fifth International Conference, 1995.
Kashioka et al., "A transistor Wire-Bonding System Utilizing Multiple Local Pattern Matching Techniques", pp. 562-570 (1976).
Kawamura et al., "On-Line Recognition of Freely Handwritten Japanese Characters Using Directional Feature Densities", IEEE, pp. 183-186, 1992.
Kersten et al., "Automatic Interior Orientation of Digital Aerial Images", Photogrammetric Engineering & Remote Sensing, vol. 63, No. 8, pp. 1007-1011 (1997).
Kersten et al., "Experience with Semi-Automatic Aerotriangulation on Digital Photogrammetric Stations", Great Lakes Conference on Digital Photogrammetry and Remote Sensing (1995).
Koller et al., "Model-Based Object Tracking in Monocular Image Sequences of Road Traffic Scenes", International Journal of Computer Vision, 1993, pp. 257-281.
Kollnig et al., "3D Post Estimation by Directly Matching Polyhedral Models to Gray Value Gradients", International Journal Computer Vision, 1997, pp. 283-302.
Kollnig et al., "3D Post Estimation by Fitting Image Gradients Directly to Polyhedral Models", IEEE, 1995, pp. 569-574.
Kovalev et al., "An Energy Minimization Approach to the Registration, Matching and Recognition of Images", Lecture Notes in Computer Science, vol. 1296, Proceedings of the 7th International Conference on Computer Analysis of Images and Patterns, pp. 613-620 (1997).
Kraut et al., "Comparison of Functional MR and H2 15o Positron Emission Tomography in Stimulation of the Primary Visual Cortex", AJNR Am J Neuroradiol 16:, American Society of Neuroradiology, Nov. 1995, 2101-2107.
Lamdan et al., "Affine Invariant Model-Based Object Recognition", IEEE Transactions on Robotics and Automation, Oct. 1990, pp. 578-589, vol. 6, No. 5.
Lang et al., "Robust Classification of Arbitrary Object Classes Based on Hierarchical Spatial Feature-Matching", Machine Vision and Applications, 1997, 123-135.
Lanser et al., "MORAL—A Vision-Based Object Recognition System for Autonomous Mobile Systems", 9 pages 1997.
Lanser et al., "Robust Video-Based Object Recognition Using CAD Models", 8 pages 1995.
Lemieux et al., "A Patient-to-Computer-Tomography Image Registration Method Based on Digitally Reconstructed Radiographs", Med. Phys., vol. 21, No. 11, pp. 1749-1760 (Nov. 1994).

(56) References Cited

OTHER PUBLICATIONS

Li et al., "A Contour-Based Approach to Multisensor Image Registration", IEEE Transactions on Image Processing, Mar. 1995, pp. 320-334, vol. 4, No. 3.
Li et al., "On Edge Preservation in Multiresolution Images, Graphical Models and image Processing", 1992, pp. 461-472, vol. 54, No. 6.
Lin et al., "On-Line Cordic Algorithms", IEEE Transactions on Computers, pp. 1038-1052. vol. 39, No. 8 1990.
Lindeberg, T, "Discrete Derivative Approximations with Scale-Space Properties: A Basis for Low-Level Feature Extraction", Journal of Mathematical Imaging and Vision, 1993, pp. 349-376.
Lu, "Shape Registration Using Optimization for Mobile Robot Navigation", Department of Computer Science, University of Toronto, 1995, 1-163.
Maes et al., "Multimodality Image Registration by maximization of Mutual Information", IEEE Transactions on Medical Imaging, vol. 16, No. 2, Apr. 1997, pp. 187-198.
Maes et al., "Comparative evaluation of multiresolution optimization strategies for multimodality image registration by maximization of mutual information", Medical Image Analysis, vol. 3, No. 4, pp. 373-386 (1999).
Maes, F., "Segmentation and Registration of Multimodal Medical Images", PhD thesis Katholieke Universiteit Leuven (1998).
MAIO et al., "Real-time face location on Gray-Scale Static Images, pattern Recognition", The Journal of the Pattern Recognition Society, 2000, 1525-1539.
Makous, W, "Optimal Patterns for Alignment", Applied Optics, vol. 13, No. 3, Mar. 1974, 6 pages.
Marchand et al., "A 2D-3D Model-Based Approach to Real-Time Visual Tracking", Institut National de Recherche en Informatique et en Automatique, No. 3920, Mar. 2000, 33 pages.
Marchand et al., "Robust Real-Time Visual Tracking using a 2D-3D Model Based Approach", IEEE 7 pp. 1999.
Marchand et al., "A 2D-3D model-based approach to real-time visual tracking", Image and Vision Computing vol. 19, Issue 13, Nov. 2001, 94155.
Masuda et al., "A robust Method for Registration and Segmentation of Multiple Range Images", Computer Vision and Image Understanding, vol. 61, No. 3, May 1995, pp. 295-307.
Masuda et al., "Detection of partial symmetry using correlation with rotated reflected images", Pattern Recognition, vol. 26, No. 88, pp. 1245-1253 (1993).
McGarry, John, Description of Acumen radius of inhibition, at least as early as Mar. 31, 1997.
McGarry, John, Description of AcuFinder boundary, at least as early as Mar. 31, 1997.
McGarry, John, Description of AcuFinder high resolution search, at least as early as Mar. 31, 1997.
McGarry, John, Description of AcuFinder models, at least as early as Mar. 31, 1997.
McGarry, John, Description of AcuFinder search results, at least as early as Mar. 31, 1997.
McGarry, John, Description of search zone, at least as early as Mar. 31, 1997.
McGarry, John, Description of AcuFinder search space sampling rate, at least as early as Mar. 31, 1997.
Medina-Mora, R., "An Incremental Programming Environment", IEEE Transactions on Software Engineering, Sep. 1981, pp. 472-482, vol. DE-7, No. 5, 1992.
Mehrotra et al., "Feature-Based Retrieval of Similar Shapes", Proceedings of the International Conference on Data Engineering, Vienna, IEEE Comp. Soc. Press, vol. COnf. 9, Apr. 19, 1993, 108-115.
Meijering et al., "Image Registration for Digital Subtraction Angiography", International Journal of Computer Vision, vol. 31, No. 2, pp. 227-246 (1999).
Miller et al., "Template Based Method of Edge Linking Using a Weighted Decision", IEEE, pp. 1808-1815, 1993.
Neveu et al., "Two-Dimensional Object Recognition Using Multi-resolution Models", Computer Vision, Graphics, and Image Processing, 1986, 52-65.
Newman et al., "3D CAD-Based inspection I: Coarse Verification", IEEE, 1992, pp. 49-52.
Oberkampf et al., "Iterative Pose Estimation Using Coplanar Feature Points", Computer Vision and Image Understanding, vol. 63, No. 3, pp. 495-511 (1996).
Oberkampf et al., "Iterative Pose Estimation Using Coplanar Feature Points", International Conference on Computer Vision and Pattern Recognition, pp. 626-627 (1993).
O'Gorman, Lawrence, "Subpixel Precision of Straight-Edged Shapes for Registration and Measurement", IEEE Transactions on Pattern Analysis and Machine Intelligence, vol. 18, No. 7, Jul. 1996, 6 pages.
Ohm, Jens-Rainer, "Digitale Bildcodierung", Springer Verlag, Berlin 217580, XP0002303066, Section 6.2 Bewegungschatzung, 1995.
Olson, et al., "Automatic Target Recognition by Matching Oriented Edge Pixels", IEEE Transactions on Image Processing, Jan. 1997, pp. 103-113, vol. 6, No. 1., 1997.
Pauwels, E. J. et al., "Finding Salient Regions in Images", Computer Vision and Image Understanding, Academic Press, San Diego, CA, US, vol. 75, No. 1-2, Jul. 1999, 73-85.
Perkins, W.A. , "Inspector: A Computer Vision System that learns to Inspect Parts", IEEE Transactions on Pattern Analysis and Machine Vision Intelligence, vol. PAMI-5, No. 6, Nov. 1983.
Plessey Semiconductors, Preliminary Information, Publication No. PS2067, May 1986, 1-5.
Pluim et al., "Interpolation Artifacts in Mutual Information-Based Image Registration", Computer Vision and Image Understanding 77, 211-232 (2000).
Pluim, J, "Multi-Modality Matching Using Mutual Information", Master's thesis, Department of Computing Science, University of Groningen (1996).
Pluim et al., "Mutual information matching and interpolation artefacts", Proc. SPIE, vol. 3661, (1999), 10 pages.
Pratt, William, "Digital Image Processing", Sun Microsystems, Inc., pp. 651-673, 1978.
Ray, R., "Automated inspection of solder bumps using visual signatures of specular image-highlights", Computer Vision and Pattern Recognition, Proceedings CVPR, 1989, 588-596.
Reuckert et al., "Nonrigid Registration of Breast MR Images Using Mutual Information", Proceedings of the Medical Image Computing and Computer Assisted Intervention Society, pp. 1144-1152 (1998).
Rignot et al., "Automated Multisensor Registration: Requirements and Techniques", Photogrammetric Engineering & Remote Sensing, vol. 57, No. 8, pp. 1029-1038 (1991).
Roche et al., "Generalized Correlation Ratio for Rigid Registration of 3D Ultrasound with MR Images", Medical Image Computing and Computer-Assisted Intervention—MICCAI 2000, pp. 567-577 (2000).
Roche et al., "Multimodal Image Registration by Maximization of the Correlation Ratio", Rapport de Recherche No. 3378, Unite de Recherche INRIA Sophia Antipolic, INRIA (Aug. 1998).
Roche et al., "The Correlation Ratio as a new Similarity Measure for Multimodal Image Registration", Medical Image Computing and Computer Assisted Intervention—MICCAI'98 pp. 1115-1124 (1998).
Rosenfeld et al., "Coarse-Fine Template Matching", IEEE Transactions on Systems, Man, and Cybernetics, 1997, pp. 104-107.
Rueckert et al., "Nonrigid Registration using Free-Form Deformations: Application to Breast MR Images", IEEE Transactions on Medical Imaging, vol. 18, No. 8, pp. 712-721 (1999).
Rummel et al., "Work piece Recognition and Inspection by a Model-Based Scene Analysis System", Pattern Recognition, 1984, pp. 141-148, vol. 17, No. 1.
Sakai et al., "Line Extraction and pattern Detection in a Photograph", Pattern Recognition, 1969, 233-248.
Sanderson et al., "Attributed Image Matching Using a Minimum Representation Size Criterion," IEEE 1989, pp. 360-365.

(56) References Cited

OTHER PUBLICATIONS

Scanlon et al., "Graph-Theoretic Algorithms for Image Segmentation", Circuits and Systems, ISCAS '99 Proceedings of the 1999 IEEE International Symposium on Orlando, FL, IEEE, May 30, 1999, 141-144.
Schutz et al., "Recognition of 3-D Objection with a Closest Point Matching Algorithm", Proc. Conference ISPRS intercommission workship, vol. 30, issue 5W1 (1995) 6 pages.
Sebastian et al., "Constructing 2D curve at lases", Proceedings IEEE Workshop on Mathematical Methods in Biomedical Image Analysis, 2000.
Seitz et al., "The Robust Recognition of Traffic Signs From a Moving Car", 1991, 287-294.
Seitz, P., "The robust recognition of object primitives using local axes of symmetry", Signal Processing, vol. 18, pp. 89-108 (1989).
Seitz, Peter, "Using Local Orientational Information as Image Primitive for Robust Object Recognition", Visual Communications and Image Processing IV, 1989, pp. 1630-1639, vol. 1199.
Shekhar et al., "Multisensor image registration by feature consensus", Pattern Recognition, vol. 32, No. 1, pp. 39-52 (1999).
Shi et al., "Normalized Cuts and Image Segmentation", Computer Vision and Pattern Recognition, Proceedings, IEEE Computer Society Conference on San Juan, IEEE Comput. Soc., Jun. 17, 1997, 731-737.
Shi et al., "Normalized Cuts and Image Segmentation", IEEE Transaction on Pattern Analysis and Machine Intelligence, vol. 22, No. 8, Aug. 2000, 888-905.
Steger, C, "An Unbiased Detector of Curvilinear Structures", Technische universitat Munchen, Technical Report FGBV-96-03, Jul. 1996, 32 pages.
Stevens et al., "Precise Matching of 3-D Target Models to Multisensor Data", IEEE Transactions on Image Processing, vol. 6, No. 1, Jan. 1997, pp. 126-142.
Stimets et al., "Rapid Recognition of Object Outlines in Reduced Resolution Images", Pattern Recognition, 1986, pp. 21-33, vol. 19, No. 1.
Stockman et al., "Matching images to models for registration and object detection via clustering", IEEE Transaction of Pattern Analysis and Machine Intelligence, IEEE Inc., New York, vol. PAMI-4, No. 3, 1982.
Streilein et al., "Towards Automation in Architectural Photogrammetry: CAD Based 3D-Feature Extraction", ISPRS Journal of Photogrammetry and Remote Sensing pp. 4-15, 1994.
Studholme et al., "An Overlap Invariant Entropy Measure of 3D Medical Image Alignment", Pattern Recognition, The Journal of the Pattern Recognition Society, Pattern Recognition 32, 71-86 (1999).
Studholme, C, "Measures of 3D Medical Image Alignment", PhD thesis, University of London (1997).
Suk et al., "New Measures of Similarity Between Two Contours Based on Optimal Bivarate Transforms", Computer Vision, Graphics and Image Processing, 1984, pp. 168-182.
Sullivan et al., "Model-based Vehicle Detection and Classification using Orthographic Approximations", The University of Reading, 10 pages 1996.
Sullivan et al., "Model-based Vehicle Detection and Classification using Orthographic Approximations", Image and Vision Computing 15, 1997, pp. 649-654.
Sullivan, Neal, "Semiconductor Pattern Overlay", Digital Equipment Corp., Advanced Semiconductor Development Critical Dimension Metrology and Process Control, Critical Reviews vol. CR52, 29 pages.
Tanaka et al., "Picture Assembly Using a Hierarchical Partial-Matching Technique", IEEE Transactions on Systems, Man., and Cybernetics, vol. SMC-8, No. 11, pp. 812-819 (Nov. 1978).
Tangelder et al., "Measurement of Curved Objects Using gradient Based Fitting and CSG Models", Commission V. Working Group 2, 8 pages.
Tanimoto, S.L., "Template Matching in Pyramids", Computer Graphics and Image Processing, vol. 16, pp. 356-369 (1981).

Thevenaz et al., "Optimization of Mutual Information for Multiresolution Image Registration", IEEE Transactions on Image Processing, vol. 9, No. 12, pp. 2083-2099 (Dec. 2000).
Tian et al., "Algorithms for Subpixel Registration", Computer Vision Graphics and Image Processing 35, Academic Press, Inc., 1986, pp. 220-233.
Tretter et al., "A Multiscale Stochastic Image Model for Automated Inspection", IEEE Transactions on Image Processing, vol. 2, No. 12, Dec. 1995, 1641-1654.
Turk et al., "Zippered Polygon Meshes for Range Images", SIGGRAPH/ACM 1994, 8 pages.
Ullman, S, "Aligning pictorial descriptions: An approach to object recognition", Cognition, vol. 32, No. 3, pp. 193-254, Aug. 1989.
Ullman et al., "Recognition by Linear Combinations of Models", A.I. Memo No. 1152, Massachusetts Institute of Technology Artificial Intelligence Laboratory, 1989, 43 pages.
Umeyama, S, "Least Squares Estimation of Transformation Parameters Between Two Point Patterns", IEEE Trans. On Pattern Analysis and Machine Intelligence, vol. 13, No. 2, pp. 119-152, 1994.
Valkenburg et al., "An Evaluation of Subpixel Feature Localisation Methods for Precision Measurement", SPIE vol. 2350, 1994, 10 pages.
Van Herk et al., "Automatic three-dimensional correlation of CT-CT, CTMRI, and CT-SPECT using chamfer matching", Medical Physics, vol. 21, No. 7, pp. 1163-1178 (1994).
Vosselman, G, "Interactive Alignment of Parameterised Object Models to Images", Commission III, Workinig Group 3, 7 pages 1998.
Wachter et al., "Tracking persons in Monocular Image Sequences", Computer Vision and Image Understanding, vol. 74, No. 3, Jun. 1999, pp. 174-192.
Wallack, Aaron, "Algorithms and Techniques for Manufacturing", Ph.D. Thesis, University of California at Berkeley, 1995, Chapter 4, 93 pages.
Wallack, Aaron S., "Robust Algorithms for Object Localization", International Journal of Computer Vision, May, 1998, 243-262.
Weese et al., "Gray-Value Based Registration of CT and MR Images by Maximization of Local Correlation", Medical Image Computing and Computer-Assisted Intervention, MICCAT'98, pp. 656-664 (1998).
Wei et al., "Recognition and Inspection of Two-Dimensional Industrial Parts Using Subpolygons", Pattern Recognition, Elsevier, Kidlington, GB, vol. 25, No. 12, Dec. 1, 1992, 1427-1434.
Wells et al., "Multi-modal Volume Registration by maximization of Mutual Information", Medical Image Analysis (1996) vol. 1, No. 1, pp. 35-51.
Wells et al., "Statistical Object Recognition", Submitted to the Department of Electrical Engineering and Computer Science, Nov. 24, 1992, 1-177.
Wells, W, "Statistical Approaches to Feature-Based Object Recognition", International Journal of Computer Vision, vol. 21, No.½, pp. 63-98 (1997).
Westling et al., "Object recognition by fast hypothesis generation and reasoning about object interactions", 7 pages, 1996.
Whichello et al., "Document Image Mosaicing", IEEE, 3 pages. 1998.
White et al., "Two Methods of Image Extension", Computer Vision, Graphics, and Image Processing 50, 342-352 (1990).
Wilson, S, "Vector morphology and iconic neural networks", IEEE Trans. Systems Man. Cybernet, 19(6):1636-1644 (1989).
Wong et al., "Sequential hierarchical scene matching", IEEE Transactions on Computers, vol. C-27(4):359-366 (1978).
Worrall et al., "Pose Refinement of Active Models Using Forces in 3D", 10 pages. 1994.
Wu et al., "Registration of a SPOT Image and a SAR Image Using Multiresolution Representation of a Coastline", 10th International Conference of pattern Recognition, Jun. 16-21, 1990, 913-917.
Wunsch et al., "Registration of CAD-Models to Images by Iterative Inverse Perspective Matching", German Aerospace Research Establishment—DLR Institute for Robotics and System Dynamics, Proceedings of the ICPR, (1996).

(56) References Cited

OTHER PUBLICATIONS

Xie et al., "A New Fuzzy Clustering Validity Criterion and its Application to Color Image Segmentation", Proceedings of the International Symposium on Intelligent Control, New York, IEEE, Aug. 13, 1991, 463-468.

Yamada, Hiromitsu, "Map Matching-Elastic Shape Matching by Multi-Angled Parallelism", Apr. 1990, pp. 553-561, vol. J73-D-II, No. 4.

Zhang, Z, "Iterative Point Matching for Registration of Free-Form Curves", INRIA, Rapports de Recherche No. 1658, Programme 4, Robotique, Image et Vision, Unite De Recherche Inria-Sophia Antipolis (Mar. 1992).

Zhang, Z, "On Local Matching of Free-Form Curves", British Machines Vision Conference, pp. 347-356 (1992).

Zhang, Z, "Iterative point matching for registration of free-form curves and surfaces", IJCV, vol. 13, No. 2, pp. 119-152 (1994).

Zhang, Zhengyou, "Parameter estimation techniques: A tutorial with application to conic fitting", Imag Vision Comput; Image and Vision computing; Elsevier Science Ltd, Oxford England, vol. 15, No. 1, Jan. 1, 1997.

Zhao et al., "A non-linear corresponder for 2D automated point distribution model constuction", Control, Automation, Robotics and Vision Conference, China, Dec. 6, 2001.

Hou et al., "A New Multi-Scale Multi-Model Automatic Image Registration Algorithm", Jul. 23, 2007, Published in: CN.

\* cited by examiner

SEMI-SUPERVISED METHOD FOR TRAINING MULTIPLE PATTERN RECOGNITION AND REGISTRATION TOOL MODELS

RELATED APPLICATIONS

This application is a divisional of co-pending U.S. patent application Ser. No. 13/955,120, filed Jul. 31, 2013, entitled A SEMI-SUPERVISED METHOD FOR TRAINING MULTIPLE PATMAX MODELS, which application claims the benefit of U.S. Provisional Application Ser. No. 61/841,142, filed Jun. 28, 2013, entitled A SEMI-SUPERVISED METHOD FOR TRAINING MULTIPLE PATMAX MODELS, the entire disclosures of each of the above applications are herein incorporated by reference.

FIELD OF THE INVENTION

The present invention relates to machine vision where images of objects are obtained using a camera or other imaging device where locating a target pattern in the image corresponds to locating the pattern on the object being imaged.

BACKGROUND OF THE INVENTION

A challenge in machine vision systems is to make them user friendly and accessible to a broader range of potential users. There are certain aspects that users understand clearly (for example, how to generate a set of training images) and what the ground truth of the situation is. However, beyond that, many of the aspects of training and run-time operation of the machine vision systems will be more difficult to apply.

In machine vision where images of objects are obtained using a camera or other imaging device and where a pattern on the object being imaged is located using a method that executes on a computer or other computing device. Given a set of images, each of which contains at least one instance of a target pattern, but where the target pattern may vary in appearance, it can also be a challenge to identify and train a minimum set of pattern recognition and registration models that are applicable for all images in the image set. The pattern recognition and registration procedure is described in greater detail in U.S. Pat. Nos. 6,408,109; 6,658,145; and 7,016,539, the disclosures of which are incorporated by reference as useful background information. If a pattern is recognized, the pattern recognition and registration procedure (or "tool") confirms that the viewed pattern is, in fact, the pattern for which the tool is searching and fixes its position, orientation, scale, skew and aspect. An example of such a search tool is the PatMax® product available from Cognex Corporation of Natick, Massa., USA. The pattern recognition and registration procedure is a method of geometric pattern finding. The methods described herein apply generally to geometric pattern finding.

For example, a pattern might consist of elements containing circles and lines. Referring to FIG. 1, pattern 110 includes a circle 112 and two intersecting lines 114, 116; pattern 120 includes a circle 122 and a pair of lines 124, 126; and pattern 130 includes a circle 132 and a pair of lines 134, 136. Across the image set of trained images, the circles may vary in radius and the lines vary by thickness or number. This may be particularly so in the field of semiconductors or other materials in which a plurality of layers are deposited on a substrate, which can lead to distortion of features on each of the layers. The polarity of the patterns may also change throughout the image set (as shown in the difference between pattern 120 and pattern 130. The images may also contain a high degree of noise.

The problem has at least two components. First, the training image set consists of noisy images so it is difficult to train a clean model from a single image. Second, the pattern has different appearances in the training set which makes training a single model both difficult and prone to error at runtime.

SUMMARY OF THE INVENTION

To overcome the disadvantages of the prior art, the systems and methods herein use a pattern recognition and registration model to perform training Illustratively, a pattern finding model is a single model trained from multiple training images. In some embodiments, composite models can be used to either improve robustness over standard pattern recognition and registration models, and/or to model small differences in appearance of a target region. To improve robustness composite models combine data from noisy (or otherwise distorted) training images showing instances of a single underlying pattern to build a single robust model. To achieve this, a training element using the pattern recognition and registration model uses the input images and a known relative position, or pose (this human-identified or computer-determined).

To account for small differences in appearance of a target region, a training method is employed to train a set of pattern recognition and registration models that span the entire range (or at least a large portion of the entire range) of appearances of the target pattern in the training set. The set of pattern recognition and registration models can manifest as either separate instances of pattern models or as a pattern multi-model. A pattern multi-model is a collection of pattern recognition and registration models. The underlying models can be standard pattern recognition and registration models or a composite pattern model, or a combination of the two. The pattern multi-model is intended for use in modeling targets whose appearance varies significantly. The multi-model can be run in various modes to take advantage of prior knowledge of the likely temporal sequence model appearances. The incorporation of multiple pattern models within the pattern multi-model framework can be used to reduce the amount of front-end processing, thus allowing for incremental performance gains over running separate pattern model instances. The pattern multi-model can also examine results from its component models to filter for overlap, for example if results from two models overlap by more than a user specified threshold, then the pattern multi-model may only return the better match (or higher scoring) result to the user.

BRIEF DESCRIPTION OF THE DRAWINGS

The invention description below refers to the accompanying drawings, of which.

DETAILED DESCRIPTION

Figure 1:
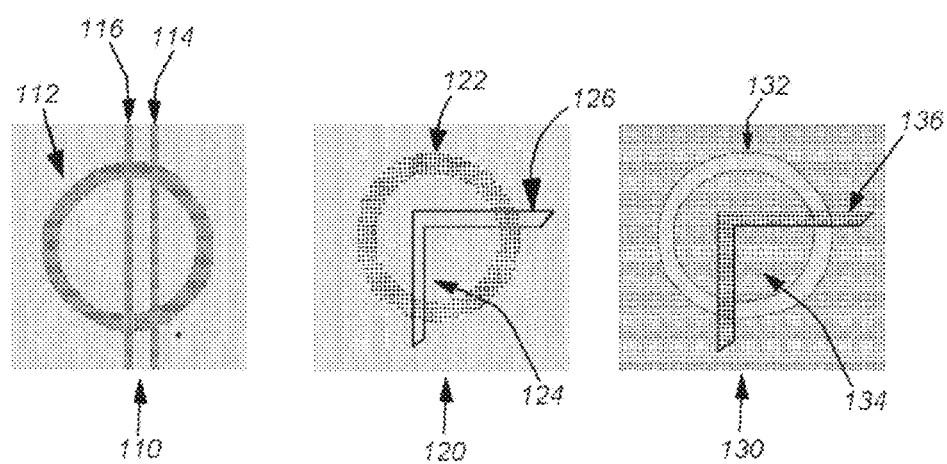
FIG. 1, already described, shows three exemplary images each including a pattern, according to a pattern recognition and registration procedure.
Figure 2:
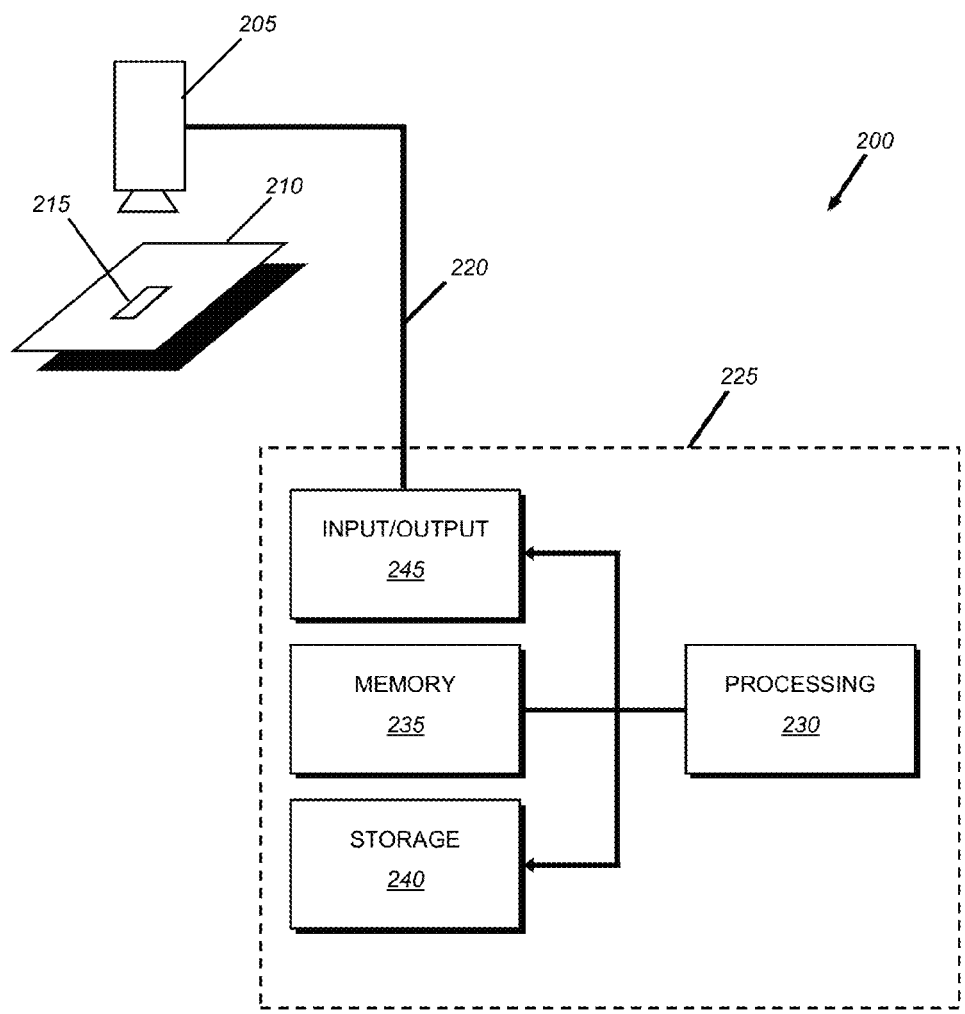
FIG. 2 is a schematic block diagram of an exemplary machine vision system for practicing the principles of the present invention in accordance with an illustrative embodiment.

FIG. 2 is a schematic block diagram of a machine vision system 200 that may be utilized to practice the principles of the present invention in accordance with an illustrative embodiment. The machine vision system 200 includes a capturing device 205 that generates an image of an object 210 having one or more features 215. The capturing device 205 can comprise a conventional video camera or scanner. Such a video camera can be a charge coupled device (CCD) or other system for obtaining appropriate image information, such as the well-known CMOS sensors. Image data (or pixels) generated by the capturing device 205 represents an image intensity, for example, color or brightness of each point in the scene within the resolution of the capturing device 205. The capturing device 205 transmits a digital image data via a communications path 220 to an image analysis system 225. The image analysis system 225 can comprise a conventional digital data processor, such as the vision processing systems of the type commercially available from, for example, Cognex Corporation. The image analysis system 225 can comprise a conventional microcomputer or other exemplary computing device. Other forms of interfaces can be utilized, including, e.g., personal digital assistants (PDAs), etc. In alternative embodiments, the capturing device can include processing capabilities to perform the functions of the image analysis system. In such embodiments, there is not a need for a separate image analysis system. In further alternative embodiments, a capturing device can be operatively interconnected with an image analysis system for training purposes. Once training has occurred, an appropriate model or models can be stored in the capturing device for use during run time.

The image analysis system 225 can be programmed in accordance with the teachings of the present invention to find similar features among a plurality of images to generate appropriate recognition and registration information for training a machine vision system. The image analysis system 225 can have one or more central processing units (processors) 230, main memory 235, input/output systems 245 and one or more disk drives or other form of mass storage 240. Illustratively, the input/output system 245 interconnects with the communications path 220 between the capturing device 205 and the image analysis system 225. The system 225 can be configured by programming instructions in accordance with the teachings of the present invention to perform the novel multi-image trained pattern recognition and registration of the present invention. As will be appreciated by those skilled in the art, alternative hardware and/or software configurations can be utilized to implement the principles of the present invention. Specifically, the teachings of the present invention can be implemented in software, hardware, firmware and/or any combination thereof. Furthermore, during run-time, as opposed to training time, additional components can be included in the machine vision system 200. For example, objects 215 can be transported by a conveyor belt or other assembly line apparatus, etc.

In accordance with an illustrative embodiment of the present invention, the machine vision system 200 can be utilized to generate the training model for a run-time machine vision system. Thus, the machine vision system 200 can be utilized to generate a training model that can be utilized in a plurality of machine vision systems utilizing similar components.

Moreover, it should be noted that the pattern element (or pattern recognition and registration element) as shown and described herein, and their associated models, generally reside within the image analysis system 225. However, the placement and storage of the elements and models are highly variable within ordinary skill.

It should be noted that while the present invention is described in terms of a machine vision system 200, the principles of the present invention can be utilized in a variety of differing embodiments. As such, the term machine vision system should be taken to include alternative systems. More generally, the principles of the present invention can be implemented on any system that registers subpatterns in images. For example, one embodiment can involve a conventional machine vision system comprising of a stand alone camera operatively interconnected with a stand alone computer programmed to process images, etc. However, the principles of the present invention can be utilized in other devices and/or systems that register subpatterns in images. For example, a vision sensor, such as the Checker product available from Cognex Corporation, or other device that comprises illumination sources, image acquisition capabilities and/or processing capabilities. Such vision sensors can be trained and/or configured via separate modules, such as a Cognex Vision View. In such embodiments, the user can train the vision sensor using a plurality of parts, instead of a single part. The user can select a first part, place it in front of the sensor and indicate to the system that the training part is positioned. A second (third, etc.) part can be similarly trained. The user can control the training step using, e.g., a graphical user interface (GUI) and/or buttons or other control surfaces located on either the training module and/or the vision sensor itself. Furthermore, the functionality of the present invention can be incorporated into handheld devices, wireless compatible devices, etc. As such, the term machine vision system should be interpreted broadly to encompass all such systems and devices that can utilize one or more of the teachings of the present invention.

Training a Single Pattern Recognition and Registration Model

In accordance with the illustrative embodiments, a pattern recognition and registration model is trained from multiple images. Refer, for example, to U.S. Pat. No. 8,315,457, the disclosure of which is incorporated by reference as useful background information, for a more detailed description of training a single pattern recognition and registration model. Composite models can be used to either improve robustness over standard pattern models, or to model small differences in appearance of a target region. A training element implemented herein trains a set of pattern recognition and registration models that span the entire range of appearances of a target pattern in a set of training images. The set of models can be a single pattern recognition and registration model, or a collection of models termed herein a pattern "multi-model" element. The multi-model element is intended for use in modeling targets those appearance varies significantly. The multi-model can be run in various modes to take advantage of prior knowledge of the likely temporal sequence model appearances.

As used herein, the term "training element" (or training module) refers to the non-transitory embodiment of the steps carried out in generating a training model. The training element is part of a non-transitory computer program that contains one (or several) routines or functions that are dedicated to perform a particular task. Each element (or module) as shown and described herein, can be used alone or combined with other modules within the machine vision system. The training element creates the training model by training a set of models that span the entire range of training images contained in the database. Additionally, as used herein, the term "pattern recognition and registration model" or "pattern model" refers generally to the pattern models disclosed in the '457 patent, unless otherwise noted.

Figure 3:
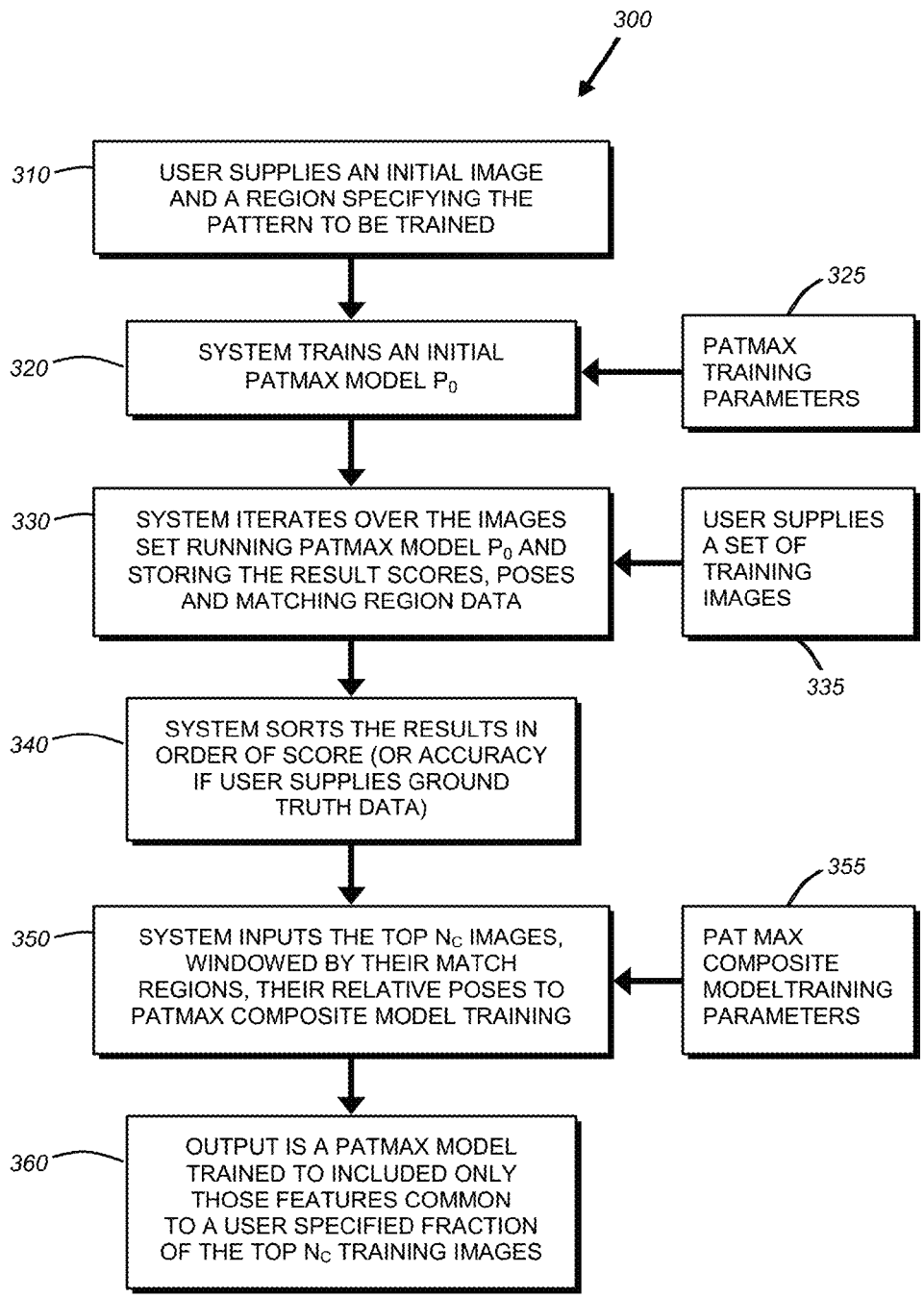
FIG. 3 is a flow chart of a procedure for training a single pattern recognition and registration model, in accordance with the illustrative embodiments.

Reference is now made to FIG. 3 showing a flow chart of a procedure 300 performed by a training element for training a single pattern recognition and registration model, in accordance with the illustrative embodiments. At step 310, the initial input to the algorithm (which can be user-provided or computer-provided) is an initial training image and a region specifying the pattern to be trained (a "region of interest") that can also be user-provided or computer-provided. The procedure 300 takes this input and at step 320 trains a first (initial) pattern recognition and registration ("PatMax") model ($P_0$) using training parameters at 325. Next, at step 330, the system iterates over the image set (at least a portion, or subset, of the remaining training images) running the pattern model $P_0$, with the image set being provided by the user or by a computer having been previously stored in a database. The system can iterate the model over the entire remaining training image set or a portion of the remaining image set and stores the result scores, poses and matching region data. At step 340 the results are sorted in order of score (and if a ground truth data is available, in order of accuracy). The ground truth can be user-supplied or computer-generated. At step 350, the procedure inputs the top image ($N_C$–1) (where $N_C$ is a parameter specifying the number of images should be input to the composite model training) and at step 360, trains a composite model using the pose and region information from the results previously generated in the running of $P_0$.

As described in greater detail in U.S. Pat. No. 8,315,457, incorporated herein by reference as useful background information, multi-image training is performed for pattern recognition and registration. A machine vision system obtains a plurality of ("N") training images. One image is selected and the other (N–1) images are then substantially registered to the selected image. The selection and registration is iterated so that each of the N images is utilized as the baseline image. By iterating for each of the N images as a baseline image, the procedure builds up a database of corresponded features that can be utilized in building a model of features that are stable among the images. Then features that represent a set of corresponding image features are added to the model. To build the database of corresponded features, each of the features can be corresponded using a boundary inspection tool or other conventional techniques to correspond contours in machine vision systems. Illustratively, those features selected for the model are those that minimize the maximum distance among the corresponding features in each of the images in which the feature appears. The feature to be added to the model can comprise an average of the features from each of the images in which the feature appears. The process continues until every feature that meets a threshold requirement is accounted for. The model that results from this process represents those stable features that are found in at least the threshold number of the N training images. This process (described in the '457 patent) identifies those features that are sufficiently supported by the evidence of the training images that they are stable features. The model can then be used to train an alignment, search or inspection tool with the set of features.

Referring back to FIG. 3, the user can supply additional composite model training parameters 355 that specify what fraction of the $N_C$ training images must contain a particular feature for it to be included in the output model. Illustratively, the fraction can be a percentage, such as 80% to 90%, but is highly variable within ordinary skill and depending upon the particular application. The user can also specify a proximity threshold for features from different training images to be considered a match.

Training a Pattern Recognition and Registration Multi-Model

Figure 4:
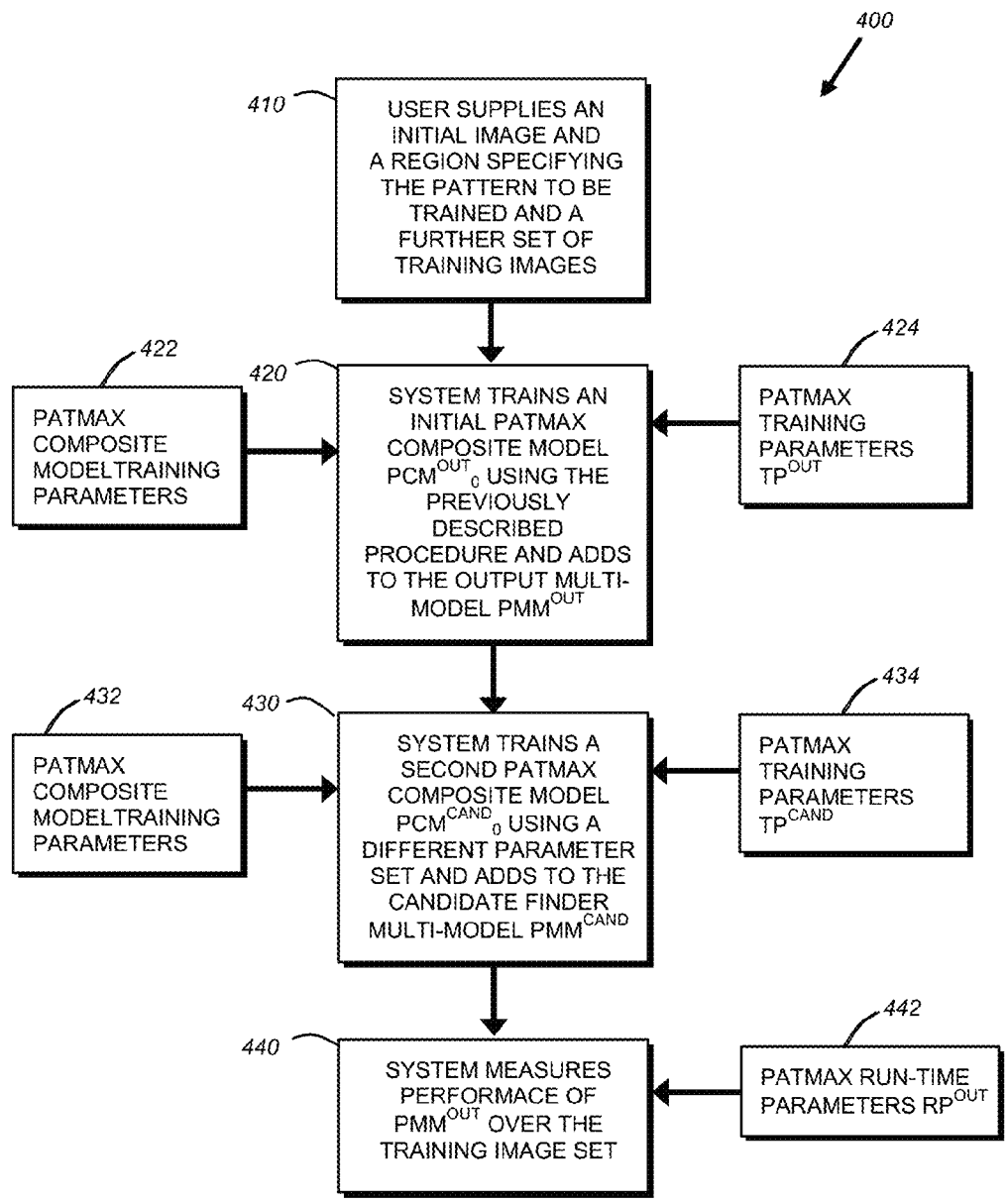
FIG. 4 is a flow chart of a procedure for training a pattern multi-model and measuring performance of a currently trained output model, in accordance with the illustrative embodiments.

Reference is now made to FIG. 4 showing a flow chart of a procedure 400 for training a pattern recognition and registration multi-model, and measuring performance of a currently trained output model, in accordance with the illustrative embodiments. At step 410, the initial inputs to the procedure (generally from a user, but can also be computer-provided) are: a training image ($I_0$), a region $R_0$ specifying the extent of a pattern within the image $I_0$, the origin of the pattern ($O_0$) within the training image $I_0$ and a set of training images $\{I_1, I_2, \ldots, I_N\}$ showing the range of appearances of the pattern of interest.

The procedure uses these inputs at step 420 to train a first "PatMax" pattern composite model ($PCM^{OUT}_0$) using the above-described procedure for training a single pattern recognition and registration model, shown in FIG. 3, according to composite model parameters 422. The training parameters 424 are used in training the output model ($TP^{OUT}$), and are restrictive enough to ensure that the trained model will not produce high scoring false finds in a search over the full set of training images. If using the pattern recognition and registration multi-model framework, then $PCM^{OUT}_0$ will be added to the output multi-model, $PMM^{OUT}$. If not using the multi-model framework, then it will be stored as the first pattern recognition and registration model of the output set (this is also called $PMM^{OUT}_0$ for descriptive purposes).

Next, at step 430, the procedure uses the same inputs (from 410) to train a different (second) pattern recognition and registration model $PCM^{CAND}_0$ using the previously described algorithm shown in FIG. 3 for a single pattern recognition and registration model. The pattern training parameters $TP^{CAND}$ 434 used in this process will also be those for training a model used exclusively for finding candidates for training further output composite models. These training parameters 434 should be more relaxed than those used to produce the output models. The governing premise is that $PCM^{CAND}_0$ is able to propose a more diverse range of training candidates than would be possible using the more restrictively trained $PCM^{OUT}_0$ but any false finds can be rejected by the user, or automatically based on known ground truths. As for the output model, $PCM^{CAND}_0$ can either be added to a pattern recognition multi-model $PMM^{CAND}$ or added to or stored in some other type of model collection.

Performance Measurement

At step 440, prior to commencing the process of finding pattern candidates and training those that are considered the "best" (highest score or match), the system must first measure the performance of the currently trained output model, i.e. $PMM^{OUT}$. To measure the performance, the procedure runs the model over the entire test set of images and calculates a combined score which is initialized to 0. If $PMM^{OUT}$ finds the pattern in an image with a score (the score range is between 0 and 1) greater than a user-defined confidence threshold, then that score is added to the combined score. However, if $PMM^{OUT}$ fails to find the pattern in an image with a score greater than a user defined confidence threshold, then 1 is subtracted from the combined score. Other similar scoring functions can be implemented by those having ordinary skill and may incorporate a measure of alignment accuracy if ground truth data is available.

Figure 5:
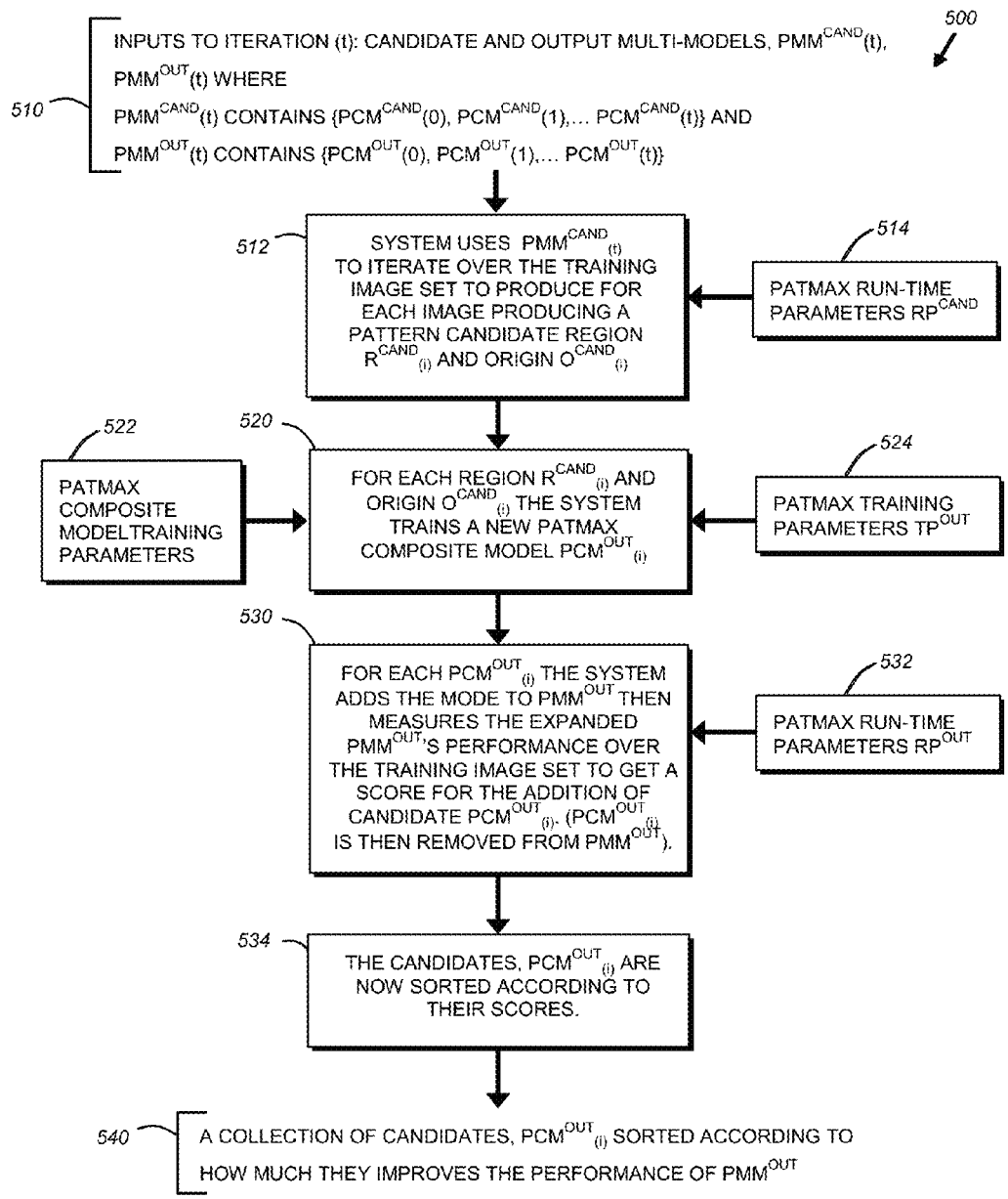
FIG. 5 is a flow chart of a procedure for proposing and ranking candidates for addition of the output model collection, in accordance with the illustrative embodiments.
Figure 6:
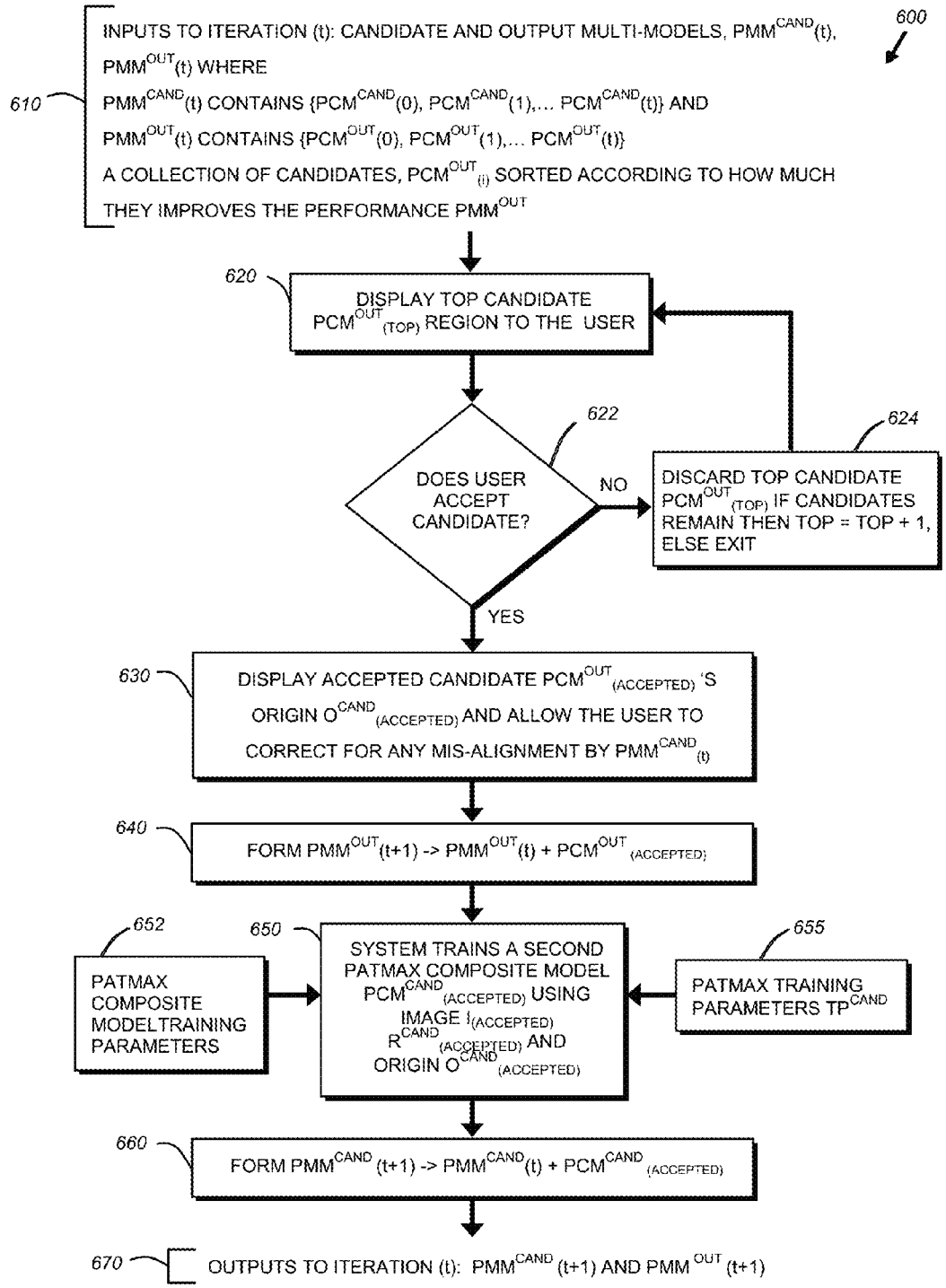
FIG. 6 is flow chart of a procedure for proposing the highest scoring candidate to the user and outputting pattern multi-models, in accordance with the illustrative embodiments.

After performance measurement, the remaining steps of the procedure can be repeated iteratively, and are thus denoted with the variable 't'. Reference is now made to FIGS. 5 and 6, showing flow charts of procedures for proposing candidate models in accordance with the illustrative embodiments. With reference to FIG. 5, the procedure 500 is for proposing and ranking candidates for addition to the output model collection, $PMM^{OUT}(T)$. At 510, the inputs to iteration (t) include candidate and output multi-models, $PMM^{CAND}(t)$, $PMM^{OUT}(t)$ where $PMM^{CAND}(t)$ contains $\{PCM^{CAND}(0), PCM^{CAND}(1), \ldots, PCM^{CAND}(t)\}$ and $PMM^{OUT}(t)$ contains $\{PCM^{OUT}(0), PCM^{OUT}(1), \ldots, PCM^{OUT}(t)\}$ At step 520 of the procedure, the candidate multi-model $PMM^{CAND}$ proposes and ranks candidates for addition to the output model collection $PMM^{OUT}(t)$. To accomplish this, the candidate pattern multi-mode, $PMM^{CAND}(t)$, is run on each training image $I_i$. If an acceptable result is returned (i.e., a location is found where the model scores higher than a user defined accept threshold), then at step 520 the matching region $R_i$ and origin $O_i$, are used to train a candidate pattern composite model $PCM^{OUT}_{(i)}$ (as described hereinabove regarding training a single model for $PMM^{OUT}(t)$. The candidate composite model is therefore trained from the candidate region $R_i$, of the image $I_i$ and the corresponding regions of the best matching $N_c-1$ images of that candidate image region ($R_i$ of the image $I_i$).

At step 530 the procedure iterates through the set of candidate pattern composite models, and for each, first adds it to the output collection $PMM^{OUT}(t) \rightarrow PMM^{OUT}(t)'$, then measures its performance in an identical way to that described hereinabove in Performance Measurement. After obtaining the score for the proposed expansion to the output multi-model, $PMM^{OUT}(t)'$, $PCM^{OUT}_{(i)}$ is removed from $PMM^{OUT}(t)' \rightarrow PMM^{OUT}(t)$. At step 534, the candidates are sorted (i.e. the $PCM^{OUT}_{(i)}$) according to these scores.

At the end of the procedure 500, the system has a collection of candidate pattern composite models at step 540 that cover all training images where PMMCAND (t) could find an acceptable result. The procedure ranks these models according to how much improvement in coverage each provides to the output pattern model collection (or multi-model) $PMM^{OUT}(t)$. If no candidates are found to improve the score by more than a user-defined amount, then a stopping criterion can be deemed to have been met.

Reference is now made to FIG. 6 showing a procedure 600 for proposing candidate models and outputting pattern multi-models, according to the illustrative embodiments. At step 620, the procedure proposes the highest scoring candidate to the user (for example, by displaying the region of interest of the candidate within the candidate image $I_i$). At step 622, the user can accept or reject the candidate, or equivalently the computer may be presented with a highest scoring candidate and the computer accepts or rejects the candidate based on a known ground truth. If the candidate is accepted, then at step 630 the user can be given the opportunity to adjust the origin of the new model, in case of slight alignment errors in the output of $PMM^{CAND}(t)$. If the candidate is rejected at step 624, the top candidate $PCM^{OUT}$ (top) is discarded and the system proposes the next candidate in the ordered list.

If the candidate is accepted, then at step 640 the accepted candidate model $PCM^{OUT}_{(accepted)}$ is added to the current output model collection $PMM^{OUT}(T) \rightarrow PMM^{OUT}(t+1)$. The candidate finder model collection (or multi-model) now should desirably be updated with a similar model. At step 650, the candidate model $PCM^{CAND}_{(accepted)}$ is trained from the region $R_{accepted}$, of the image $I_{accepted}$, using training parameters $TP^{CAND}$. $PCM^{CAND}_{(accepted)}$ is now added to $PMM^{CAND}(t) \rightarrow PMM^{CAND}(t+1)$ at step 660. The outputs to iteration (t) at step 670 are the candidate multi-model $PMM^{CAND}(t+1)$ and the output multi-model $PMM^{OUT}(t+1)$.

The various illustrative embodiments provide for generation of a pattern recognition and registration model that is iterated over each training image of a plurality of training images to provide a model that spans (i.e. is valid over) the entire database of training images. This improves robustness and efficiency of the run-time system.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Also, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Moreover, it is contemplated that some or all vision system processing tasks can be carried out either in the main module or in a remote processor (e.g. a server or PC) that is operatively connected through the interface module to the main module via a wired or wireless communication (network) link. Accordingly, this description is meant to be taken only by way of example, and not to otherwise limit the scope of this invention.

What is claimed is:

1. A method for training a pattern recognition and registration multi-model, the method comprising the steps of:
providing at least one initial training image having a region specifying a pattern to be trained, the at least one initial training image being provided from a database containing a plurality of training images;
training a first pattern model from the at least one initial training image and the region and adding the first pattern model to an output multi-model;
iterating over the remaining training images of the plurality of training images so that for each training image,
(i) an additional pattern model may be trained,
(ii) a metric for the combination of the first and additional model may be scored over the remaining training images in the database;
adding the high scoring additional pattern model or models to the output multi-model.

2. The method as set forth in claim 1 wherein the training of the first pattern model is performed according to a first set of pattern recognition and registration training parameters and the training of the additional pattern model is performed according to a second set of pattern recognition and registration training parameters.

3. The method as set forth in claim 1 wherein the first and/or the additional pattern model comprises a composite model.

4. The method as set forth in claim 1 wherein the additional pattern model is trained by relaxing the degrees-of-freedom when generating candidate regions using the first model to train, and then tightening the degrees-of-freedom when the second pattern model is run, to determine if a metric improves.

5. The method as set forth in claim 4 wherein the metric comprises the score or the number of instances of features.

6. The method as set forth in claim 4 wherein the additional pattern model is trained from the initial training image and specified region but with different training parameters so that the additional pattern model will be more likely to find distorted, noisy or in some way modified instances of the original pattern;
proposing candidate regions using a second pattern model, for use in training additional pattern models.

7. The method as set forth in claim 1 wherein a pattern origin is an additional input to pattern model training.

8. The method set forth in claim 1 wherein the high scoring additional pattern model is first presented to a user to accept, reject or rescore, before possible addition to the output multi-model.

9. The method set forth in claim 1 wherein a user may modify the additional pattern origin before its addition to the output multi-model.

10. The method set forth in claim 1 wherein the training process for the additional pattern model is repeatedly iteratively, thus allowing the multi-model to expand to contain greater than 2 pattern models.

11. The method as set forth in claim 10 wherein a stopping condition is applied; the stopping condition being derived from the relative improvement in the metric.

12. The method set forth in claim 1 but where supplied ground truths for the each of the plurality of images in the training image database may be used to accept or reject and/or correct the poses of candidate models for addition to the multi-model.

* * * * *